United States Patent
Mills et al.

(10) Patent No.: US 12,254,439 B2
(45) Date of Patent: *Mar. 18, 2025

(54) CONTROL SYSTEM FOR CONTAINER TERMINAL AND RELATED METHODS

(71) Applicant: All Terminal Services, LLC, Westmont, IL (US)

(72) Inventors: Mark D. Mills, Odessa, FL (US); Artem Igorevich Davtyan, New Port Richey, FL (US); Matthew Michael McDermott, Weeki Wachee, FL (US); Jorge A. Perez Rincon, Odessa, FL (US); Christopher Alexander, Tarpon Springs, FL (US)

(73) Assignee: All Terminal Services, LLC, Westmont, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/748,961

(22) Filed: Jun. 20, 2024

(65) Prior Publication Data

US 2024/0354690 A1  Oct. 24, 2024

Related U.S. Application Data

(63) Continuation of application No. 18/060,162, filed on Nov. 30, 2022, which is a continuation-in-part of
(Continued)

(51) Int. Cl.
*G06Q 10/083* (2024.01)
(52) U.S. Cl.
CPC .................. *G06Q 10/083* (2013.01)
(58) Field of Classification Search
CPC ..................................... G06Q 10/083
(Continued)

(56) References Cited

U.S. PATENT DOCUMENTS 2,853,968 A  9/1958  McLean
7,813,846 B2  10/2010  Wills et al.
(Continued)

FOREIGN PATENT DOCUMENTS

CN  107364434  11/2017
CN  110457420  11/2019
(Continued)

OTHER PUBLICATIONS

Jung, Seungwon; Kim, Yongsung; Hwang, Eenjun. Real-time car tracking system based on surveillance videos. EURASIP Journal on Image and Video Processing; New York vol. 2018, Iss. 1, (Nov. 2018): 1-13. (Year: 2018).*
(Continued)

*Primary Examiner* — Florian M Zeender
*Assistant Examiner* — Fawaad Haider
(74) *Attorney, Agent, or Firm* — Arnall Golden Gregory LLP

(57) ABSTRACT

A control system is for a container terminal with containers. The control system includes a server, and a terminal tractor operable within the container terminal. The terminal tractor comprises onboard tractor sensors configured to generate sensor data of at least some of the containers, a geolocation device configured to generate a geolocation value for the terminal tractor, a wireless transceiver, and a controller coupled to the onboard tractor sensors, the geolocation device, and the wireless transceiver. The controller is configured to transmit the sensor data and the geolocation value for the terminal tractor to the server. The server is in communication with the terminal tractor and is configured to generate a database associated with the sensor data, the database comprising, for each container, a container type value, a container logo image, and a vehicle classification value.

19 Claims, 26 Drawing Sheets

Related U.S. Application Data application No. 16/951,015, filed on Nov. 18, 2020, now Pat. No. 12,020,148.

(60) Provisional application No. 63/284,071, filed on Nov. 30, 2021, provisional application No. 62/936,715, filed on Nov. 18, 2019.

(58) Field of Classification Search
USPC .......................................................... 705/28
See application file for complete search history.

(56) References Cited

U.S. PATENT DOCUMENTS

| | | | |
|---|---|---|---|
| 8,180,590 B2 | 5/2012 | Szwilski et al. | |
| 8,280,567 B2 | 10/2012 | Brand et al. | |
| 8,532,842 B2 | 9/2013 | Smith et al. | |
| 8,942,426 B2 | 1/2015 | Bar-Am | |
| 10,029,708 B2 | 7/2018 | Viviani | |
| 10,597,053 B2 | 3/2020 | Mian et al. | |
| 12,020,148 B1 | 6/2024 | Mills et al. | |
| 2002/0188593 A1 | 12/2002 | Moser et al. | |
| 2005/0125113 A1 | 6/2005 | Wheeler et al. | |
| 2008/0086393 A1 | 4/2008 | Naghshiineh et al. | |
| 2009/0015400 A1 | 1/2009 | Breed | |
| 2010/0063734 A1 | 3/2010 | Kumar | |
| 2012/0130562 A1* | 5/2012 | Brand | B61L 3/125 701/19 |
| 2015/0201165 A1 | 7/2015 | Bocionek et al. | |
| 2017/0001653 A1* | 1/2017 | Ferencz, Jr. | G16Y 10/40 |
| 2017/0032316 A1 | 2/2017 | Benedict | |
| 2017/0154347 A1 | 6/2017 | Bateman | |
| 2019/0311625 A1 | 10/2019 | Anvari | |
| 2020/0125877 A1 | 4/2020 | Phan et al. | |
| 2020/0265377 A1 | 8/2020 | Al Dhaheri et al. | |
| 2024/0029092 A1 | 1/2024 | Simpson | |
| 2024/0354687 A1 | 10/2024 | Mills et al. | |
| 2024/0386269 A1 | 11/2024 | Mills et al. | |
| 2024/0386270 A1 | 11/2024 | Mills et al. | |

FOREIGN PATENT DOCUMENTS

| | | | | |
|---|---|---|---|---|
| CN | 110457420 A | * | 11/2019 | ............ G06F 16/29 |
| EP | 3275764 | | 1/2018 | |
| EP | 3275764 A1 | * | 1/2018 | ............ B61L 23/041 |
| RU | 2630859 | | 9/2017 | |
| WO | WO-2016-191711 | | 12/2016 | |

OTHER PUBLICATIONS

U.S. Appl. No. 16/951,015, filed Nov. 18, 2020, Mark D. Mills et al.
U.S. Appl. No. 18/060,162, filed Nov. 30, 2022, Mark D. Mills et al.
U.S. Appl. No. 18/731,207, filed May 31, 2024, Mark D. Mills et al.
U.S. Appl. No. 18/744,198, filed Jun. 14, 2024, Mark D. Mills et al.
U.S. Appl. No. 62/936,715, filed Nov. 18, 2019, Mark D. Mills.
U.S. Appl. No. 16/951,015, dated Dec. 5, 2023, Office Action issued by the U.S. Patent and Trademark Office.
U.S. Appl. No. 16/951,015, dated Apr. 29, 2024, Notice of Allowance issued by the U.S. Patent and Trademark Office.
U.S. Appl. No. 18/731,207, dated Sep. 20, 2024, Office Action issued by the U.S. Patent and Trademark Office.
U.S. Appl. No. 18/731,207, dated Nov. 18, 2024, Notice of Allowance issued by the U.S. Patent and Trademark Office.
U.S. Appl. No. 18/744,198, dated Oct. 18, 2024, Office Action issued by the U.S. Patent and Trademark Office.

* cited by examiner

CONTROL SYSTEM FOR CONTAINER TERMINAL AND RELATED METHODS

RELATED APPLICATION

This Application is a continuation of U.S. application Ser. No. 18/060,162 filed Nov. 30, 2022, which claims the benefit of U.S. Provisional Application No. 63/284,071 filed Nov. 30, 2021, and U.S. application Ser. No. 18/060,162 filed Nov. 30, 2022 is a continuation-in-part of U.S. application Ser. No. 16/951,015 filed on Nov. 18, 2020, which claims the benefit of U.S. Provisional Application No. 62/936,715 filed on Nov. 18, 2019. The entire contents of these applications are incorporated herein by reference in their entirety.

TECHNICAL FIELD

The present disclosure relates to the field of shipping, and, more particularly, to a system for monitoring shipping containers within a container terminal and related methods.

BACKGROUND

Shipping is a major international industry. Indeed, ninety percent of world trade is shipped. Historically, the shipping industry moved freight in odd sized wooden crates. Of course, this lead to inefficiencies in filling cargo holds of trains and ships. This led to the development of the standardized shipping container, as disclosed in U.S. Pat. No. 2,853,968 to McLean. The standardized shipping container became ubiquitous in the shipping industry, and led to the growth of intermodal shipping, i.e. shipping the same container over different modes of transport (e.g. train (railcar container), truck, and watercraft) without reloading.

The heart of a railway transit system is the railway yard, which includes a complex set of railroad tracks for loading and unloading cargo (e.g. shipping containers) from trains. Because of number of tracks and trains within the railway yard, it can be onerous to keep track of containers as they are switched between one train and another, or simply offloaded for motor vehicle (i.e. semi-truck) transport.

SUMMARY

Generally, a control system is for a container terminal with a plurality of containers therein. The control system comprises a server, and a terminal tractor operable within the container terminal. The terminal tractor comprises a plurality of onboard tractor sensors configured to generate sensor data of at least some of the plurality of containers, a geolocation device configured to generate a geolocation value for the terminal tractor, a wireless transceiver, and a controller coupled to the plurality of onboard tractor sensors, the geolocation device, and the wireless transceiver. The controller is configured to transmit the sensor data and the geolocation value for the terminal tractor to the server. The server is in communication with the terminal tractor and is configured to generate a database associated with the sensor data, the database comprising, for each container, a container type value, a container logo image, and a vehicle classification value.

In some embodiments, the plurality of onboard tractor sensors may comprise an image sensor configured to generate container image data, and a proximity sensor configured to detect a presence of plurality of containers. The container image data may comprise container video data, and the server may be configured to weight detected objects in the container terminal based upon a number of frames including the detected objects. The server may be configured to identify each container based upon the container image data. The server may be configured to perform optical character recognition (OCR) on the container image data. The server may be configured to perform machine learning on the container image data. The server may be configured to execute a first machine learning model comprising a convolutional neural network (CNN) trained to predict a location of text sequences in the container image data. The server may be configured to execute a second machine learning model comprising a recurrent neural network (RNN) for scanning the text sequences and predicting a sequence of missing characters.

Also, the plurality of onboard tractor sensors may comprise a plurality of image sensors configured to generate a plurality of container image data streams. The server may be configured to merge the plurality of container image data streams.

Another aspect is directed to a server in a control system for a container terminal with a plurality of containers therein. The control system comprises a terminal tractor operable within the container terminal and comprising a plurality of onboard tractor sensors configured to generate sensor data of at least some of the plurality of containers, a geolocation device configured to generate a geolocation value for the terminal tractor, a wireless transceiver, and a controller coupled to the plurality of onboard tractor sensors, the geolocation device, and the wireless transceiver. The server comprises a processor and memory cooperating therewith and in communication with the terminal tractor. The processor is configured to receive the sensor data and the geolocation value for the terminal tractor from the terminal tractor, and generate a database associated with the sensor data, the database comprising, for each container, a container type value, a container logo image, and a vehicle classification value.

Yet another aspect is directed to a method of operating a server in a control system for a container terminal with a plurality of containers therein. The control system comprises a terminal tractor operable within the container terminal and comprising a plurality of onboard tractor sensors configured to generate sensor data of at least some of the plurality of containers, a geolocation device configured to generate a geolocation value for the terminal tractor, a wireless transceiver, and a controller coupled to the plurality of onboard tractor sensors, the geolocation device, and the wireless transceiver. The method comprises operating the server in communication with the terminal tractor to receive the sensor data and the geolocation value for the terminal tractor from the terminal tractor, and generate a database associated with the sensor data, the database comprising, for each container, a container type value, a container logo image, and a vehicle classification value.

DETAILED DESCRIPTION

Figure 1:
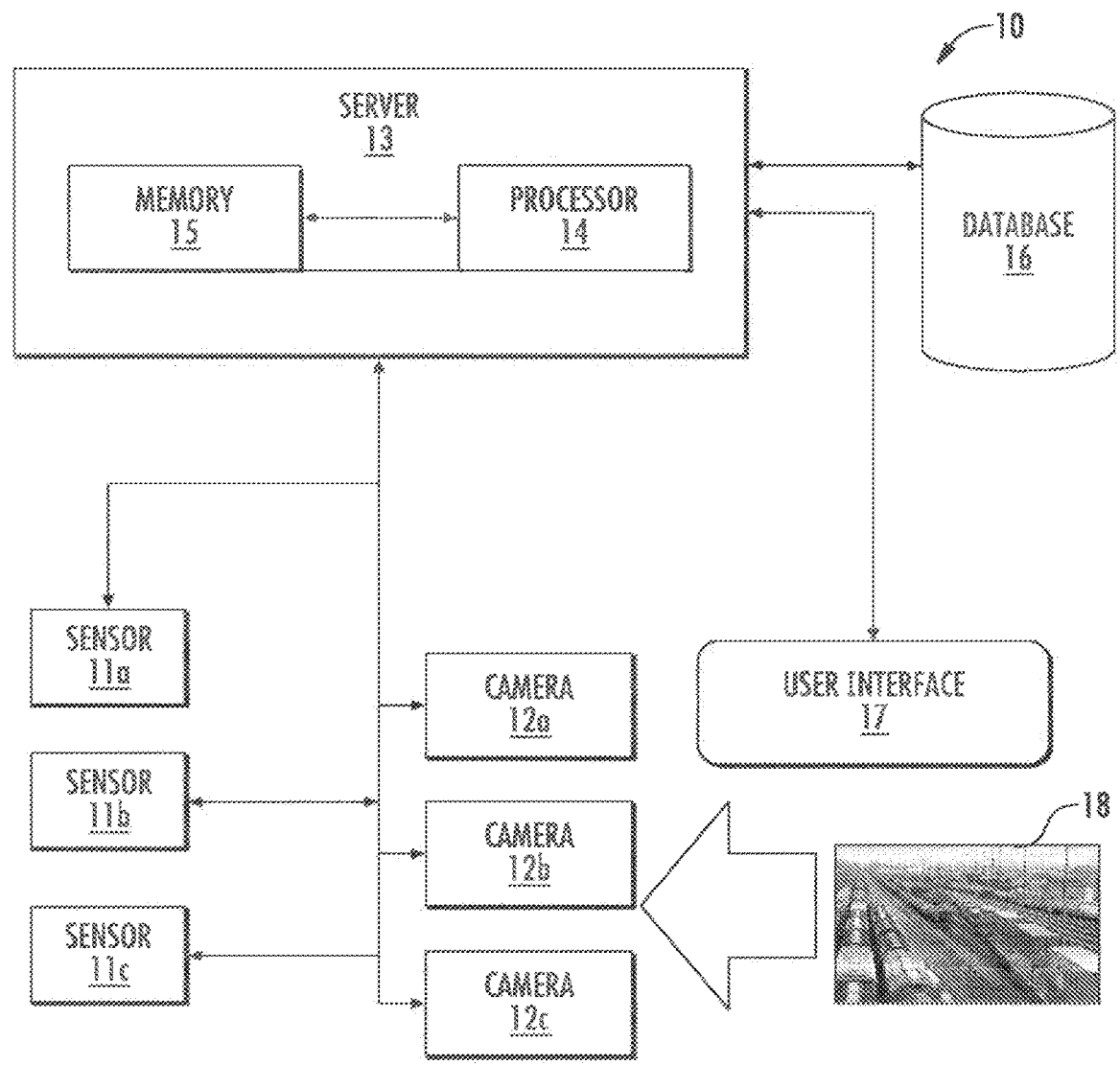
FIG. 1 is a schematic diagram of a tracking system, according to a first example embodiment of the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Referring initially to FIG. 1, a tracking system 10 according to the present disclosure is now described. The tracking system 10 is for monitoring and tracking a plurality of containers (railcar container) within a railway yard 18. As will be appreciated, as containers transit in and out of the railway yard 18, it is critical to monitor the status and location of the containers to verify their proper routing. Moreover, there is a desire to monitor the movement of the containers to verify that safety protocols are being followed.

The tracking system 10 illustratively comprises a plurality of sensors 11*a*-11*c* configured to generate sensor data. The plurality of sensors 11*a*-11*c* may comprise one or more of pressure sensors positioned on tracks, and motion sensors positioned on or adjacent to the tracks. The tracking system 10 illustratively includes a plurality of cameras 12*a*-12*c* configured to generate image data, and a server 13 in communication with the plurality of sensors and the plurality of cameras. The plurality of cameras 12*a*-12*c* may comprise one or more different types of cameras, for example, pan tilt zoom (PTZ) cameras, fixed cameras, and night vision cameras (i.e. infrared cameras).

The server 13 illustratively includes a processor 14 and memory 15 cooperating therewith. The server 13 may comprise a device local to the railway yard 18. In particular, the server 13 may be coupled to the plurality of sensors 11*a*-11*c* and the plurality of cameras 12*a*-12*c* over a local area network (LAN), for example, a wired LAN or a wireless local area network (WLAN). In these embodiments, the server 13 would also be coupled to the Internet to provide remote access.

In some embodiments, the server 13 may be provided within a cloud infrastructure, such as Amazon Web Services, Microsoft Azure, and the Google Cloud Platform. In these embodiments, the server 13 is coupled to the plurality of sensors 11*a*-11*c* and the plurality of cameras 12*a*-12*c* over the LAN and the Internet.

The processor 14 and memory 15 are configured to generate a database 16 associated with the plurality of containers based upon the sensor data and the image data. The database 16 may include a plurality of entries respectively associated with the plurality of containers. Each entry comprises a container type value, a container logo image, and a vehicle classification value. Of course, this list is merely exemplary, and the entry can include other data values, such as point of origin and destination. In essence, the server 13 is configured to perform data fusion operations on the sensor data and the image data to provide a snapshot of the containers in the railway yard 18.

The processor 14 and memory 15 are configured to store the database 16, and provide a user interface 17 to access the database. The user interface 17 may comprise a web interface accessible over the Internet.

Another aspect is directed to a method for operating a tracking system 10 for a plurality of containers within a railway yard 18. The method includes operating a plurality of sensors 11*a*-11*c* to generate sensor data, operating a plurality of cameras 12*a*-12*c* to generate image data, and operating a server 13 in communication with the plurality of sensors and the plurality of cameras. The method comprises operating the server 13 to generate a database 16 associated with the plurality of containers based upon the sensor data and the image data. The database 16 includes a plurality of entries respectively associated with the plurality of containers. Each entry comprises a container type value, a container logo image, and a vehicle classification value. The method comprises operating the server 13 to store the database 16, and provide a user interface 17 to access the database.

Figure 2:
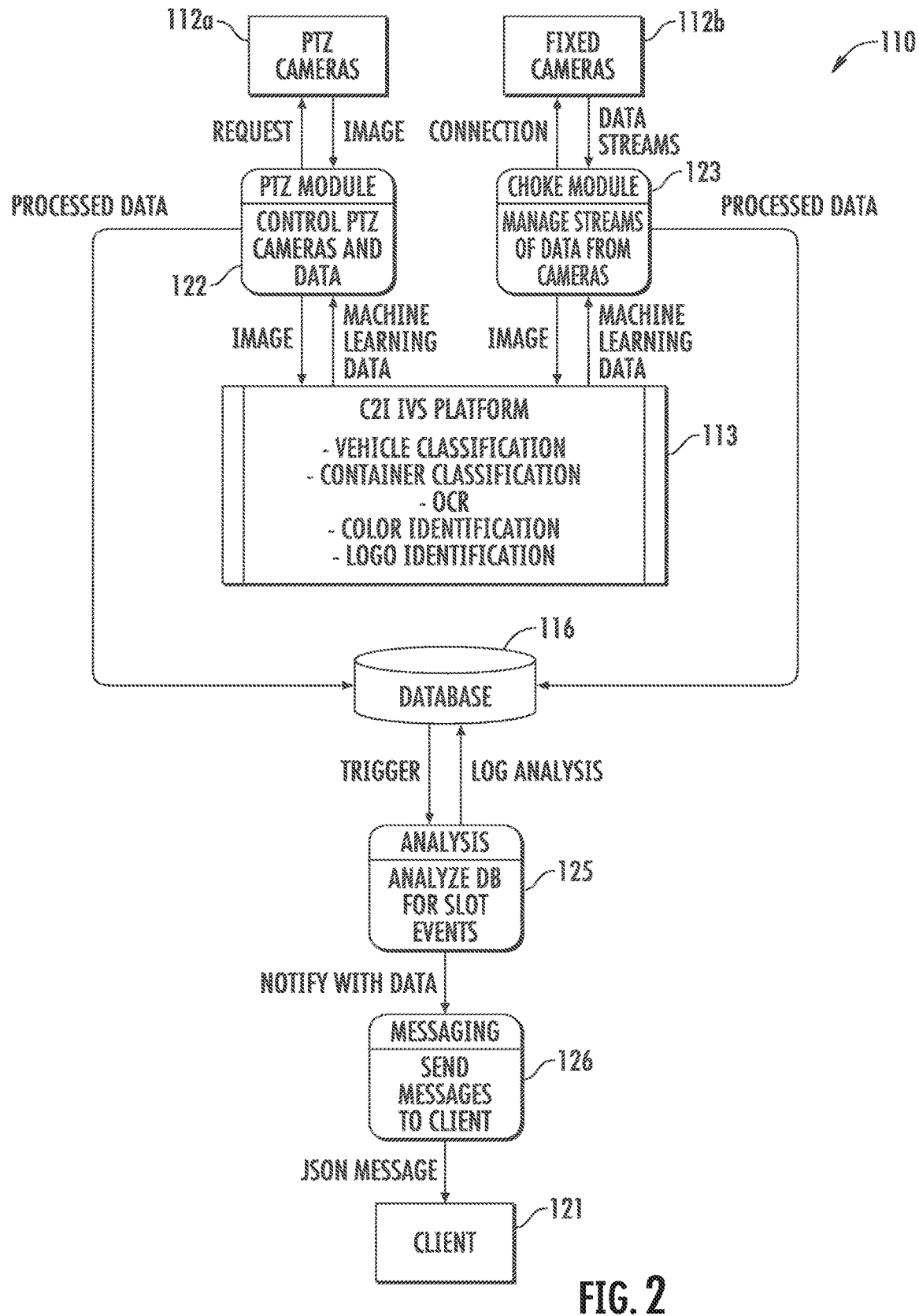
FIG. 2 is a schematic diagram of railcar data flow in the tracking system of FIG. 1.
Figure 3:
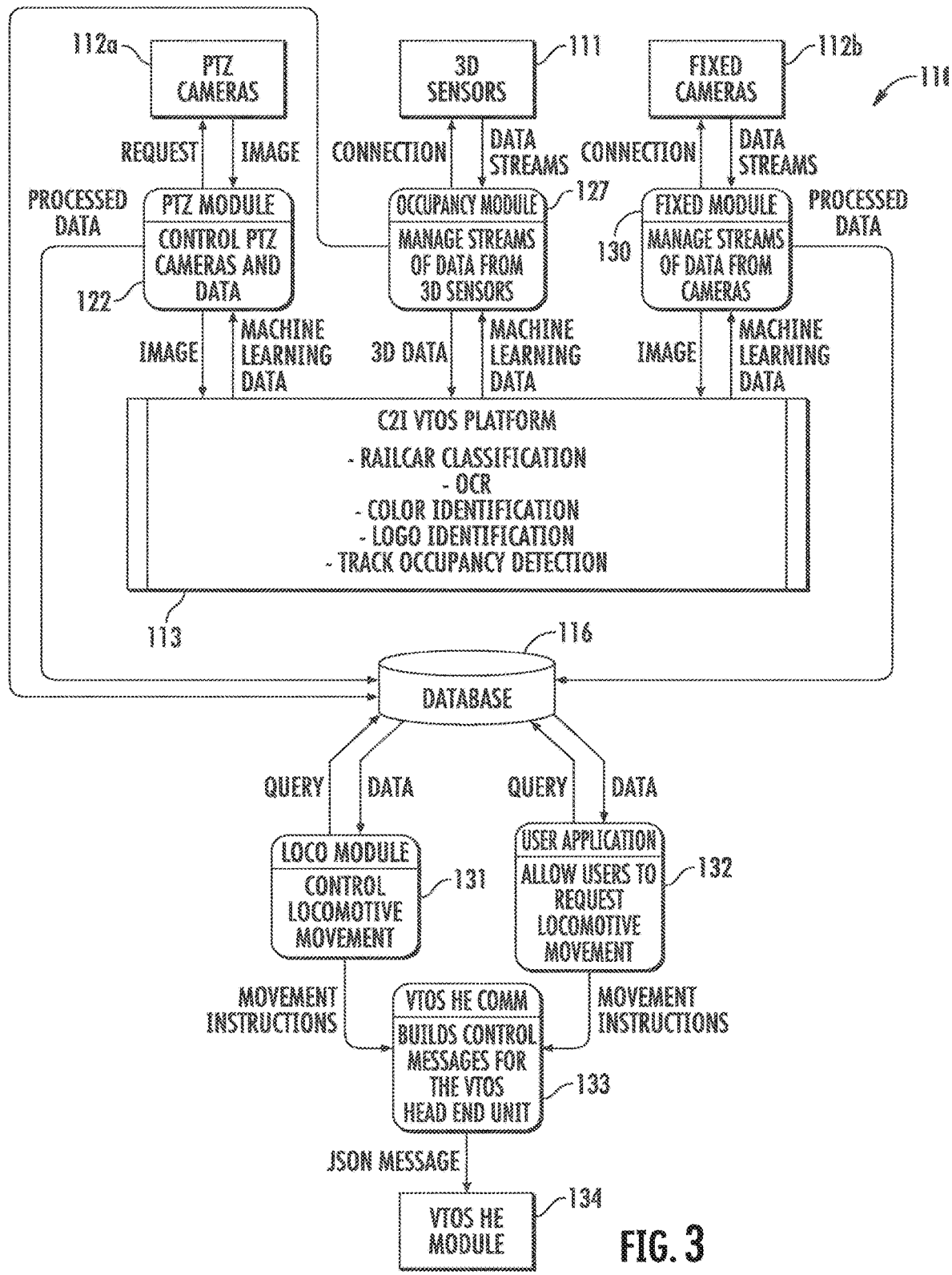
FIG. 3 is a schematic diagram of rail automation flow in the tracking system of FIG. 1.
Figure 4:
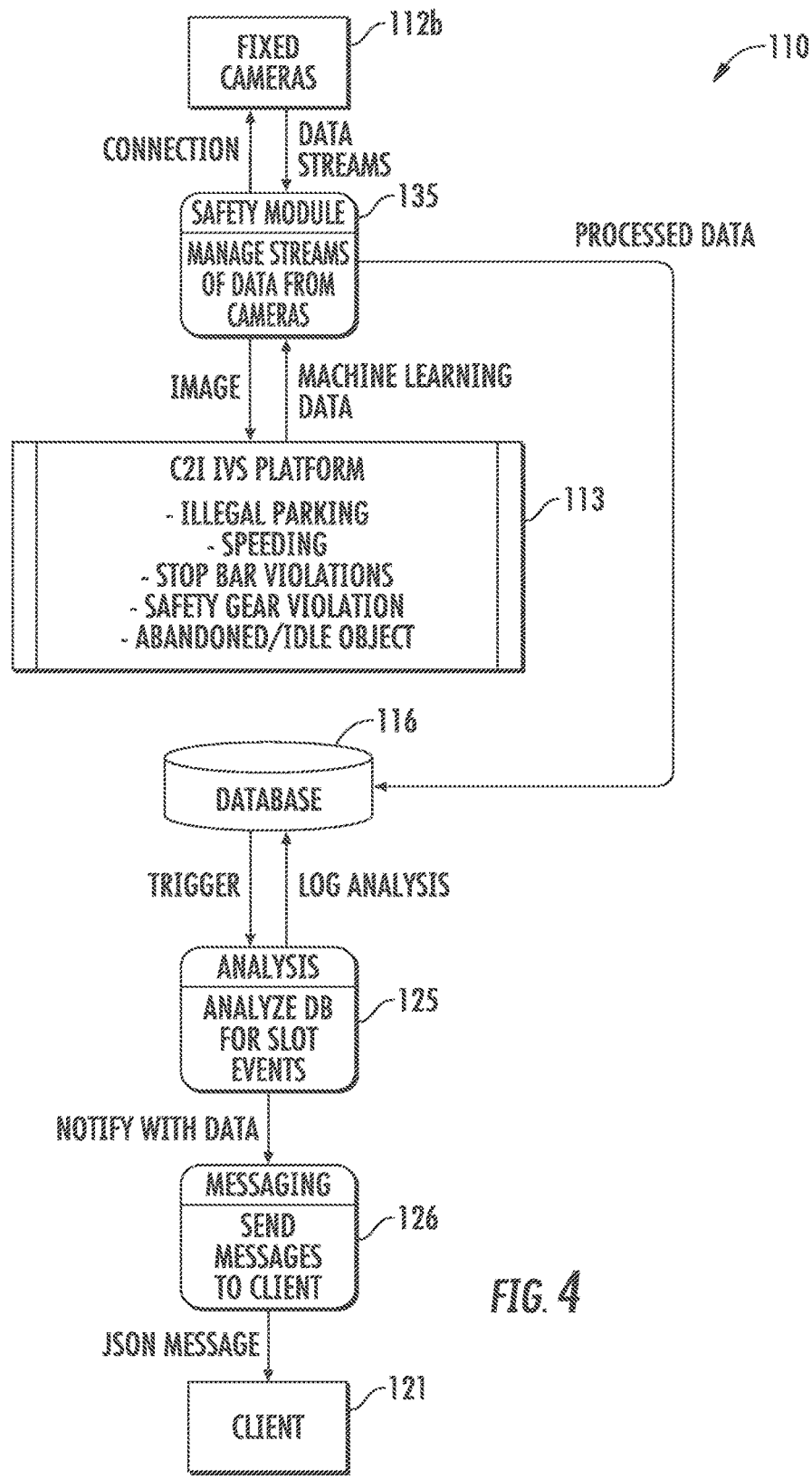
FIG. 4 is a schematic diagram of safety flow in the tracking system of FIG. 1.
Figure 5A:
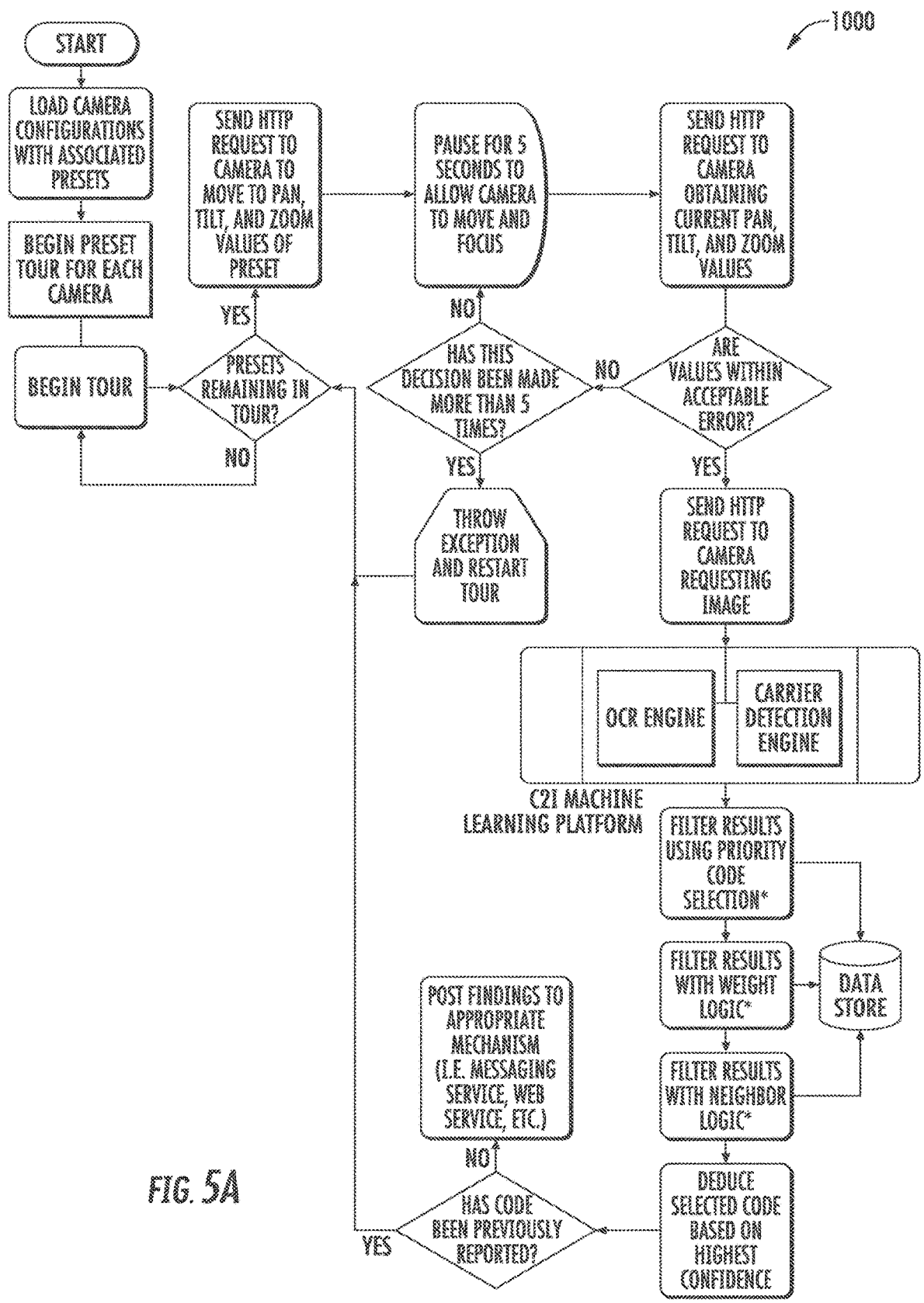
FIGS. 5A-5D are flowcharts of rail service flow in the tracking system of FIG. 1.
Figure 5B:
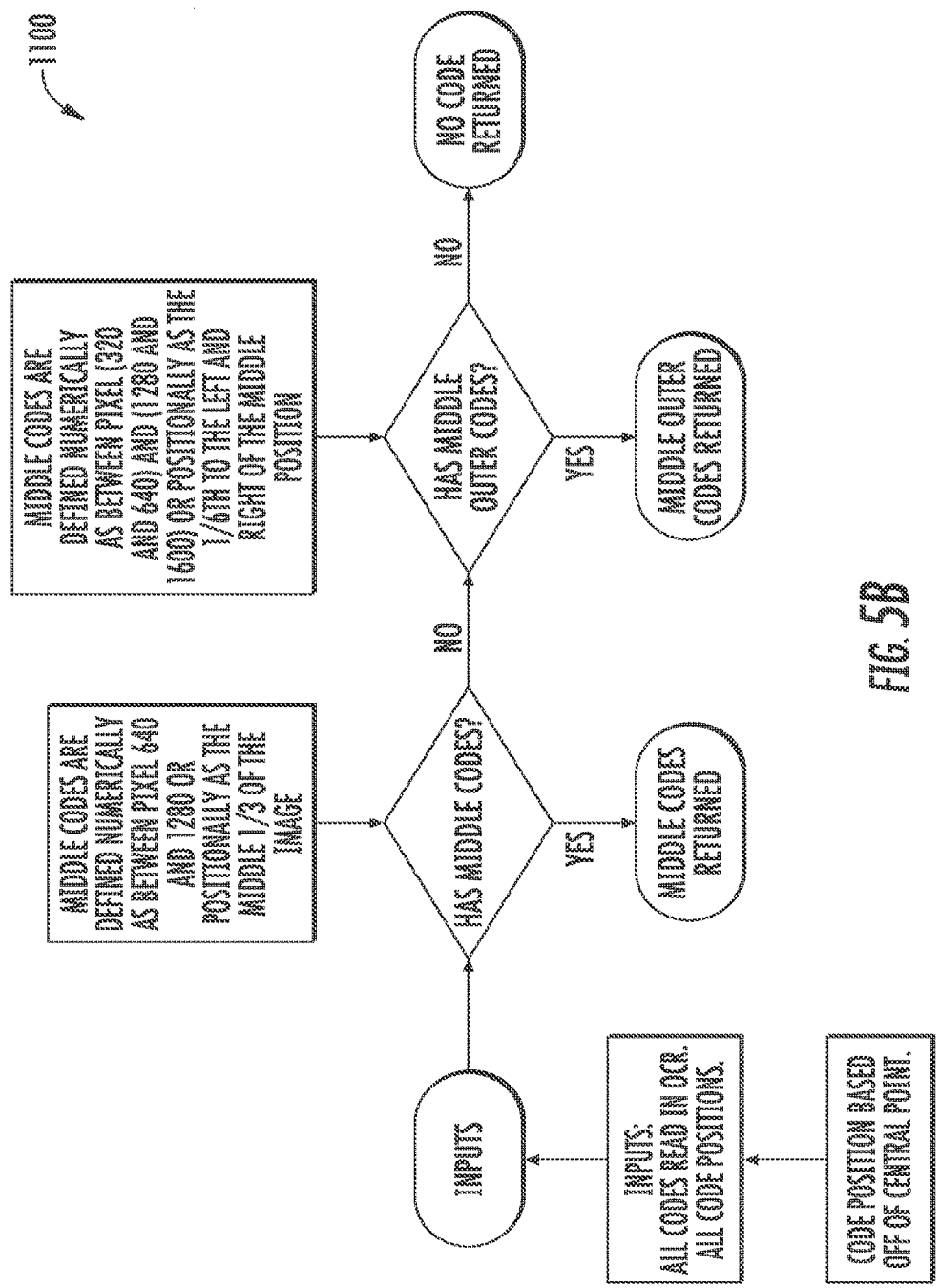
Figure 5C:
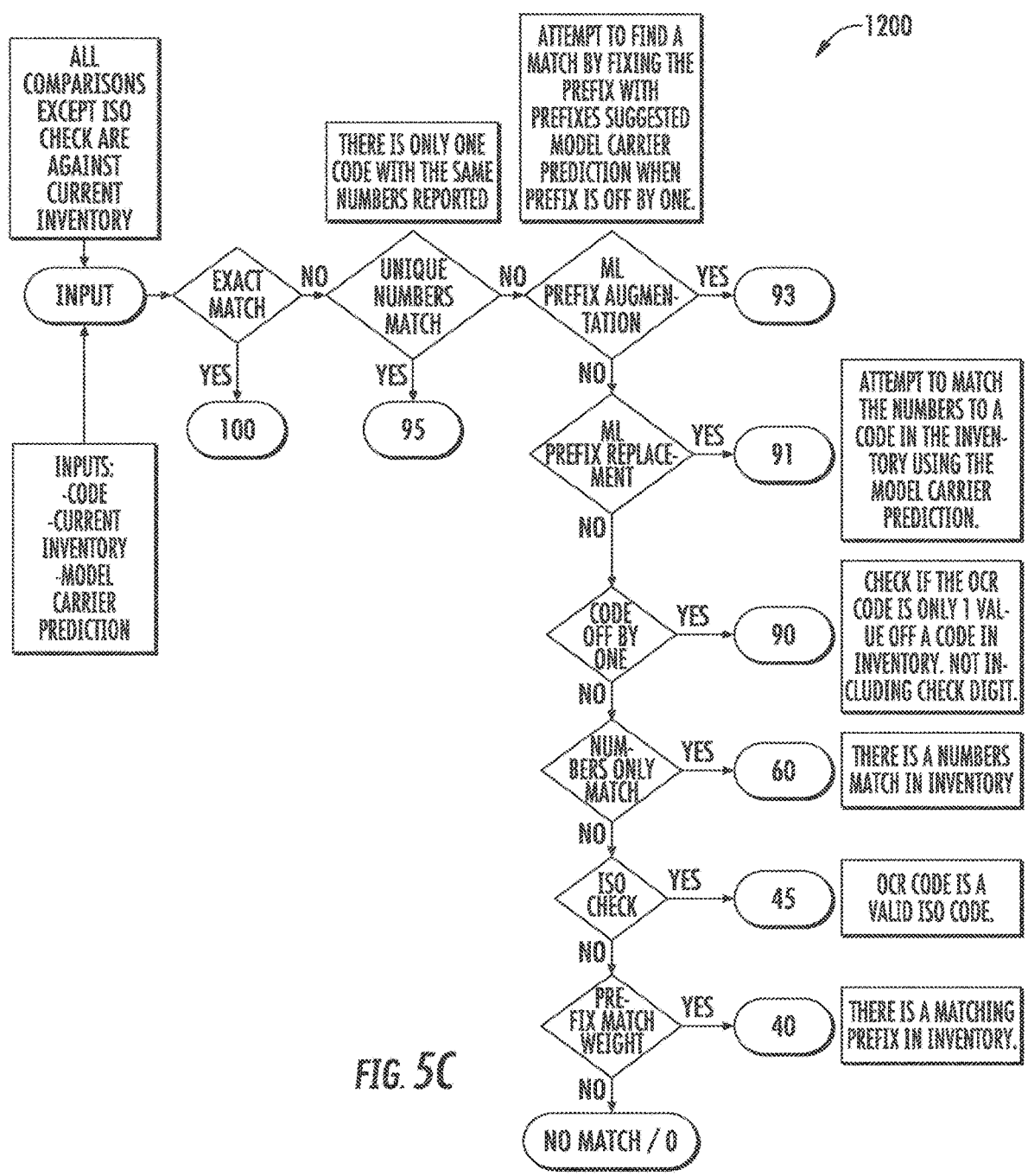
Figure 5D:
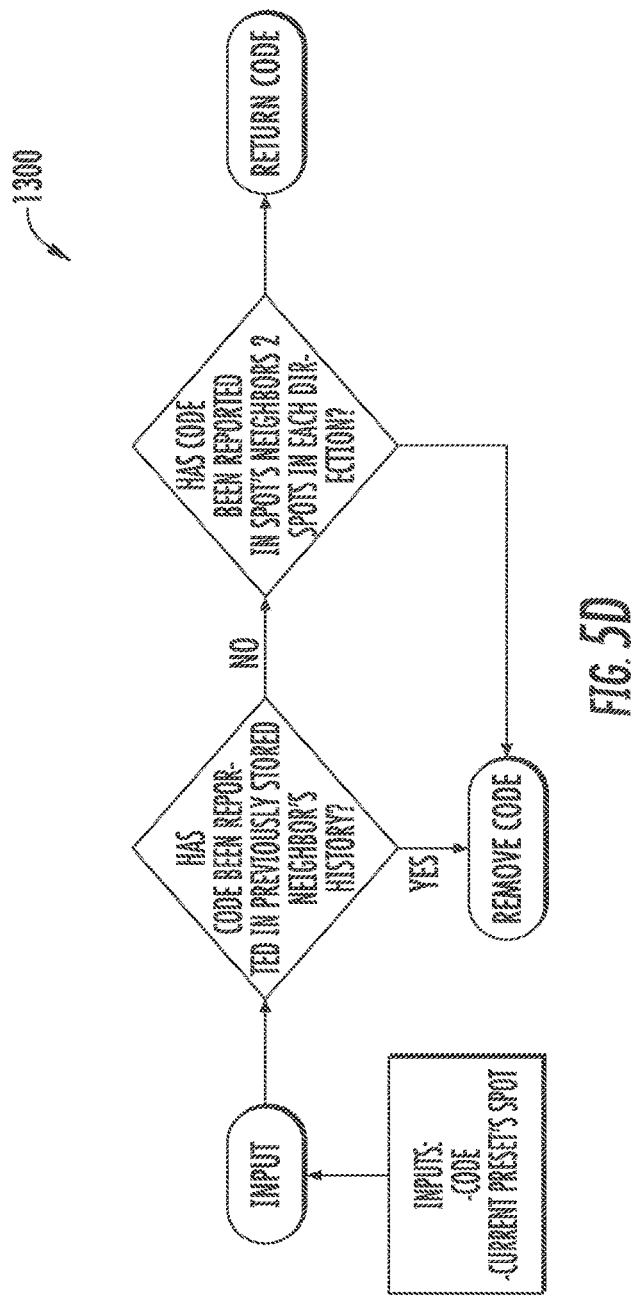

Referring now additionally to FIGS. 2-4, another embodiment of the tracking system 110 is now described. In this embodiment of the tracking system 110, those elements already discussed above with respect to FIG. 1 are incremented by 100 and most require no further discussion herein.

Referring to FIG. 2, the container data flow process of the tracking system 110 is described. Here, the tracking system 110 illustratively includes a plurality of PTZ cameras 112*a* and a plurality of fixed cameras 112*b* configured to monitor the plurality of containers within the railway yard 18. In particular, the plurality of fixed cameras 112*b* may be situated to monitor rails with the railway yard at strategic locations. The plurality of PTZ cameras 112*a* may be used to more flexibly monitor the rest of the railway yard.

The tracking system 110 illustratively includes a PTZ module 122 coupled between the plurality of PTZ cameras 112*a* and the server 113. The PTZ module 122 is configured to control the plurality of PTZ cameras 112*a* and route data flow therefrom. The tracking system 110 illustratively includes a choke module 123 coupled between the plurality of fixed cameras 112*b* and the server 113 and configured to manage the dataflow therebetween.

The tracking system 110 illustratively includes an analysis module 125 coupled to the database 116, a messaging module 126 coupled to the analysis module, and a client 121 in communication with the messaging module. The analysis module 125 is configured to analyze data within the database 116 for slot events. The messaging module 126 is configured to generate messages based upon the output of the analysis module 125 and send appropriate messages to the client 121.

In this embodiment, the server 113 comprises a C2I Intermodal Vision System (IVS) platform. In particular, the server 113 is configured to classify each container with a vehicle type, and a container type. The server 113 is also configured to process the image data from the pluralities of PTZ and fixed cameras 112a, 112b with optical character recognition (OCR) processing to generate text strings, determine a color of each container, and generate image data associated with a logo carried by the container. For a respective container, using the text string, the logo image data, and the determined color, the server 114 is able to track and identify the respective container within the railway yard 18.

Referring to FIG. 3, the rail automation flow of the tracking system 110 is described. In this flow, the tracking system 110 illustratively includes a plurality of three dimensional (3D) sensors 111 (i.e. a sensor that provides 3D data regarding a sensed object), and an occupancy module 127 coupled between the plurality of 3D sensors and the server 113. The occupancy module 127 is configured to manage the dataflow between the server 113 and the plurality of 3D sensors 111 and determine whether assigned tracks are currently occupied by containers.

The tracking system 110 illustratively includes a fixed module 130 coupled between the plurality of fixed cameras 112b and the server 113 and configured to manage the dataflow therebetween. The tracking system 110 illustratively includes a locomotive module 131 coupled to the database 116 and a user application module 132 also coupled to the database. The locomotive module 131 is configured to control movement of locomotives in the railway yard 18. The user application module 132 is configured to process user requests for locomotive movement.

The tracking system 110 illustratively comprises a communications module 133 coupled to both the locomotive module 131 and the user application module 132. Also, the tracking system 110 illustratively comprises a visual track occupancy system head end (VTOS-HE) module 134 coupled to the communications module 133 configured to receive messages from the communications module. For example, the messages may comprise a JavaScript Object Notation (JSON) format message. Of course, other message formats can be used. The server 113 is configured to determine railcar classification and track occupancy detection within the railway yard 18.

Referring to FIG. 4, the safety flow process of the tracking system 110 is described. Here, the tracking system 110 illustratively includes a safety module 135 coupled between the plurality of fixed cameras 112b and the server 113. The server 113 is configured to monitor for illegal parking and speeding in the railway yard 18, monitor for stop bar violations in the railway yard, monitor for safety gear violations in the railway yard, and monitor for abandoned/idled objects in the railway yard.

It should be appreciated that the server 113 may be situated in the cloud infrastructure for some embodiments. In these cloud embodiments, the controller modules (i.e. the PTZ module 122, the choke module 123, the occupancy module 127, the fixed module 130, the locomotive module 131, the communications module 133, and the safety module 135) for data flows would be local to the railway yard 18.

Referring now additionally to FIGS. 5A-5D, flowcharts 1000, 1100, 1200, 1300 illustrate rail service flow in an exemplary embodiment of the tracking system 110. In particular, flowchart 1000 shows control of the plurality of cameras 12a-12c, and how they are panned within the railway yard 18. Also, the flowchart 1000 shows how images are sorted for OCR processing. Flowchart 1100 shows images are processed in sectional fashion, prioritizing the middle portion of the image. Flowcharts 1200, 1300 show how the tracking system 110 parses and identifies vehicle classification values.

Figure 6:
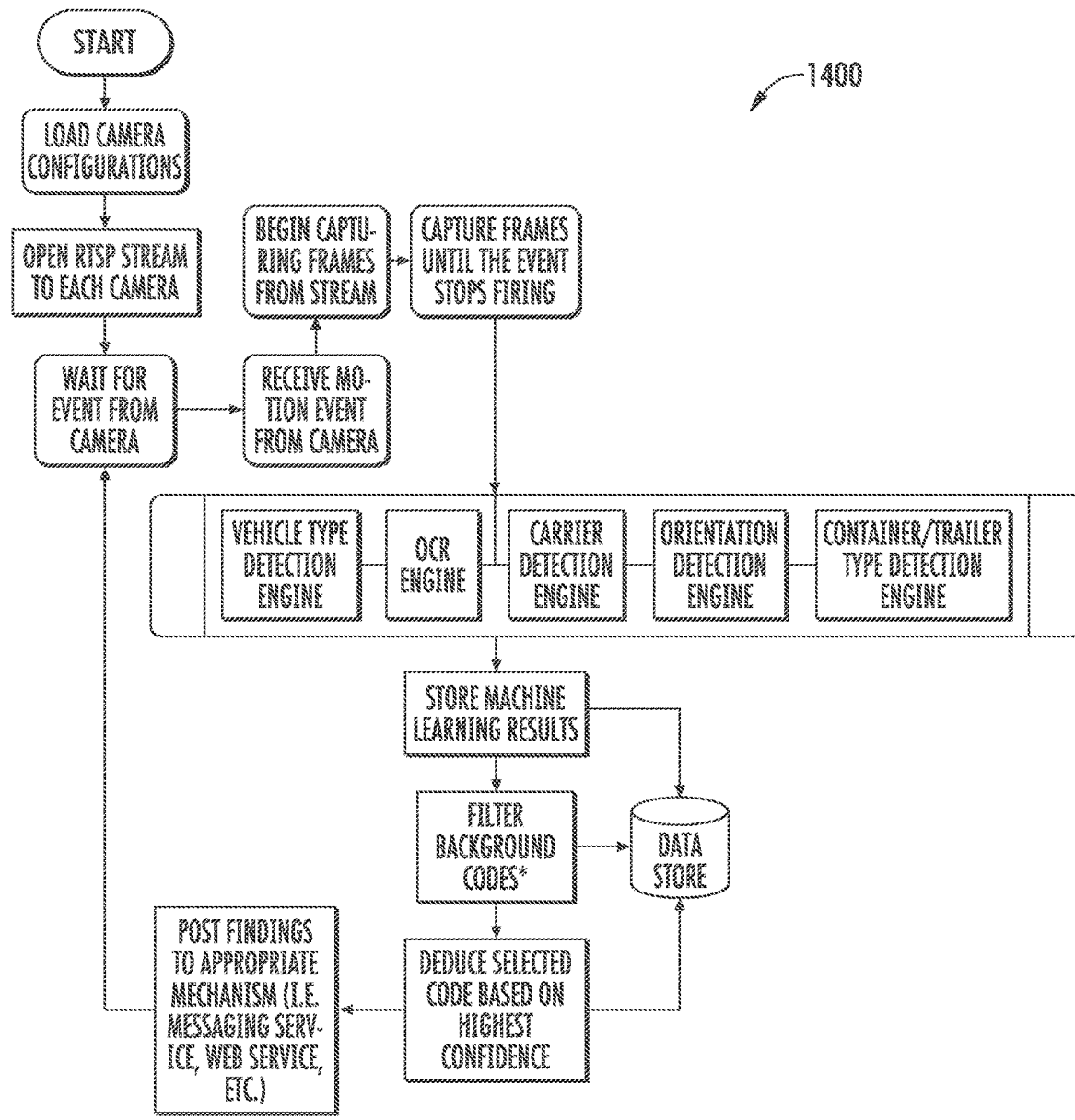
FIG. 6 is a flowchart of choke flow in the tracking system of FIG. 1.

Referring now additionally to FIG. 6, a flowchart 1400 illustrates the choke flow in an exemplary embodiment of the tracking system 110. In particular, the tracking system 110 times streams from the plurality of cameras 12a-12c based upon the detection of events at the cameras.

Figure 7:
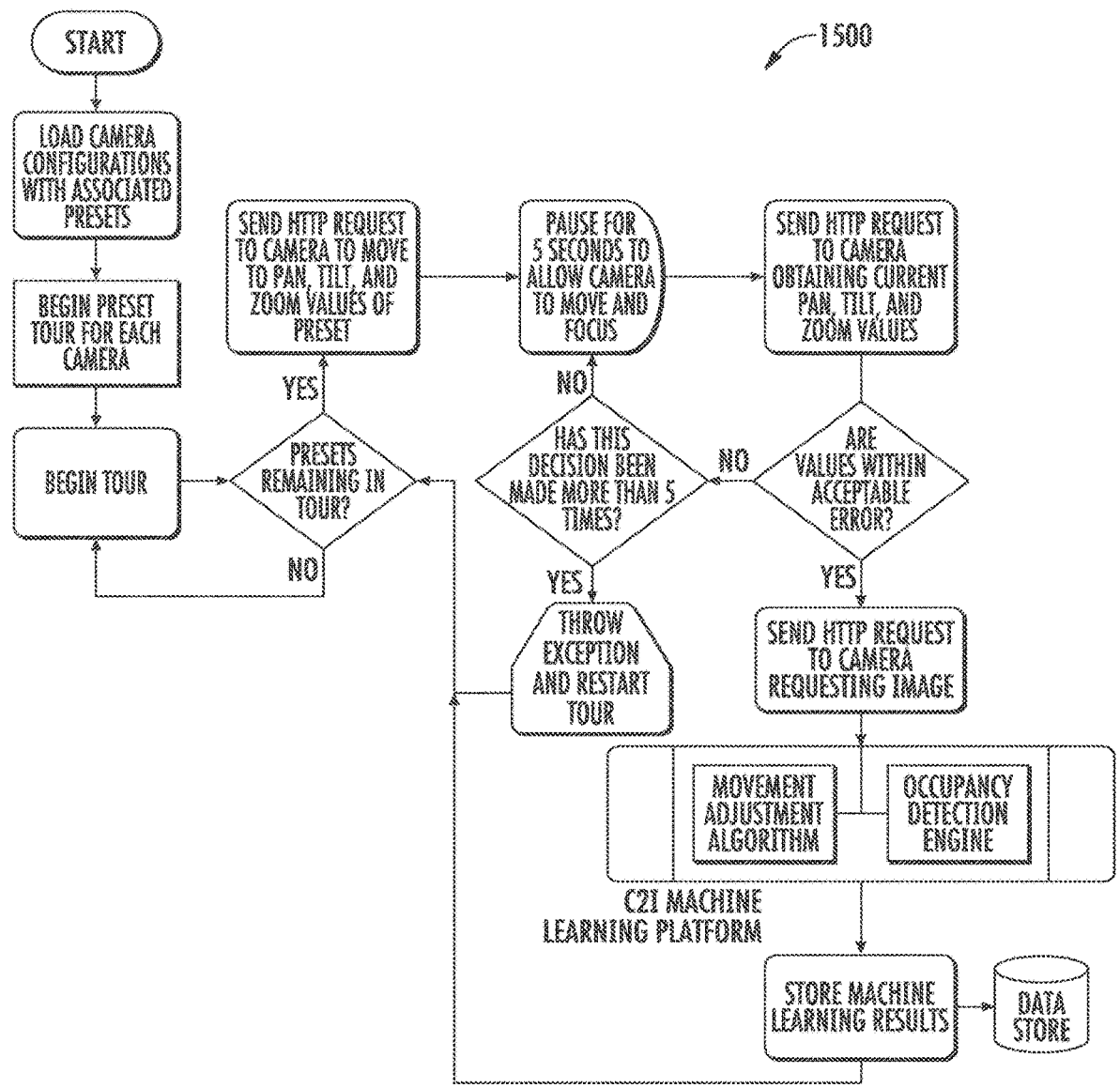
FIG. 7 is a flowchart of occupancy flow in the tracking system of FIG. 1.

Referring now additionally to FIG. 7, a flowchart 1500 illustrates occupancy flow in an exemplary embodiment of the tracking system 110. Again, the flowchart 1500 shows control of the plurality of cameras 12a-12c, and how they are panned within the railway yard 18. The images are fed into the occupancy detection algorithm, which comprises a machine learning component.

Figure 8:
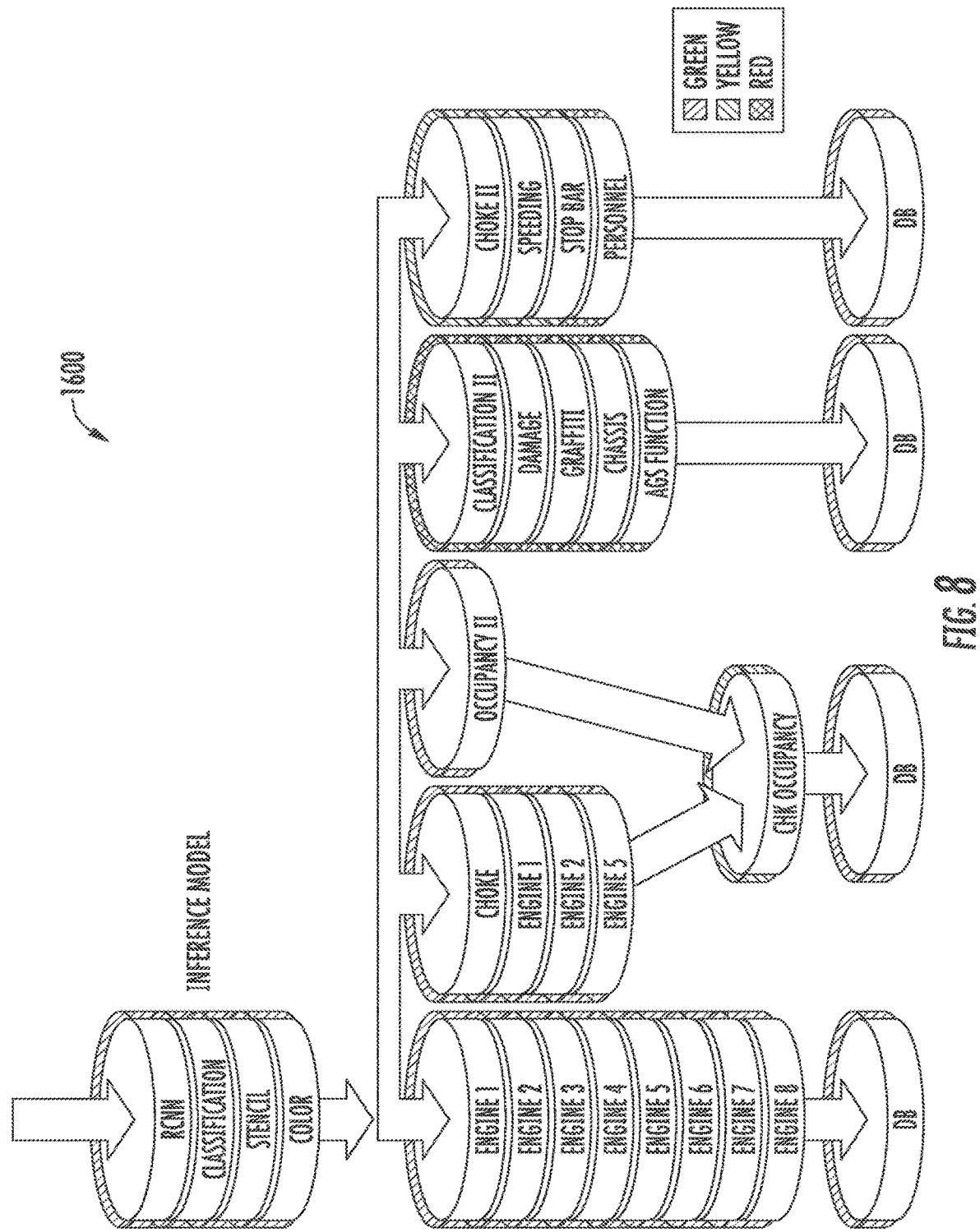
FIG. 8 is a schematic diagram of the first example embodiment of the tracking system.

Referring now additionally to FIG. 8, a diagram 1600 illustrates computational engines of an example embodiment of the tracking system 110. In this embodiment, the computation engines illustratively comprise an interference model outputting downstream in a plurality of columns. The plurality of columns comprises a choke occupancy column, and a classification column.

Figure 13:
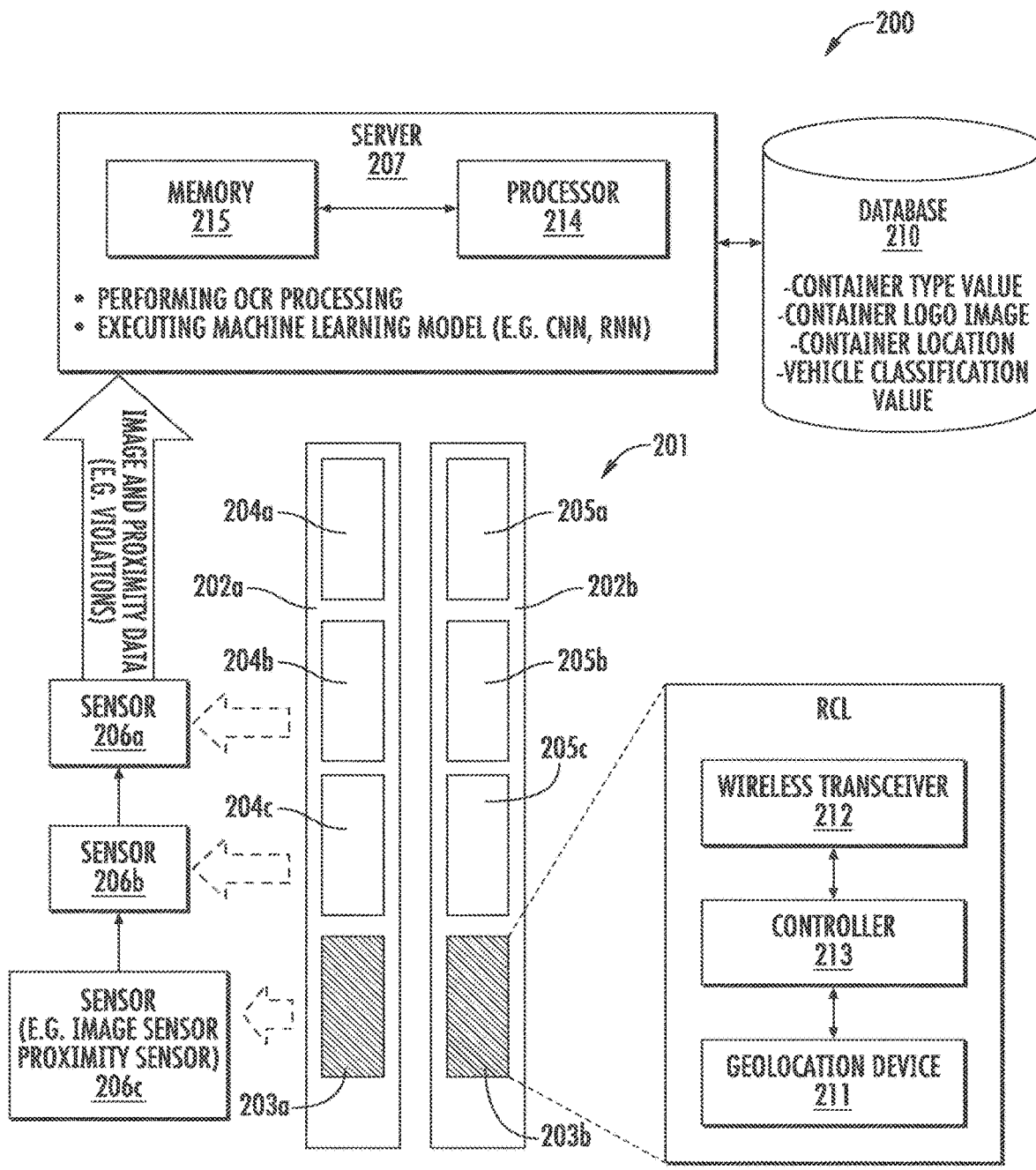
FIG. 13 is a schematic diagram of a control system, according to a second example embodiment of the present disclosure.

Referring now to FIG. 13, a control system 200 according to the present invention is now described. The control system 200 is for a railway yard 201 with a plurality of railroad tracks 202a-202b. As will be appreciated, one or more of the features described above in the tracking system 10, 110 may be incorporated into the control system 200.

The control system 200 illustratively includes a plurality of RCLs 203a-203b and sets of railcars 204a-204c (e.g. a container, a railcar container, boxcar, a cargobeamer car, a coil car, a combine car, a flatcar, such as a container flatcar, a schnable car, a gondola car, a Presflo and Prestwin car, a bulk cement wagon car, a roll-block car, slate wagon car, stock car, a tank car, a tank wagon car or tanker, a milk car, a "Whale Belly" car, a transporter wagon car, and a well car), 205a-205c respectively associated therewith on the plurality of railroad tracks 202a-202b. As will be appreciated, each RCL 203a-203b is capable of pushing or pulling a respective set of railcars 204a-204c, 205a-205c on the plurality of railroad tracks 202a-202b.

Each RCL 203a-203b illustratively comprises a geolocation device 211 (e.g. global positioning service (GPS) receiver) configured to generate a geolocation value for a respective RCL, a wireless transceiver 212 configured to enable remote control, and a controller 213 coupled to the wireless transceiver and the geolocation device. For example, the wireless transceiver 212 may comprise a cellular transceiver, or a WLAN transceiver (e.g. WiFi, WiMAX).

In some embodiments, each RCL 203a-203b comprises a plurality of onboard image sensors coupled to the controller 213b and generating a corresponding plurality of video streams. The controller 213 is configured to transmit the plurality of video streams to a remote control.

The control system 200 illustratively includes a plurality of railyard sensors 206a-206c configured to generate railyard sensor data of the plurality of railroad tracks 202a-202b. In some embodiments, the plurality of railyard sensors 206a-206c may comprise an image sensor configured to generate railyard image data. In other embodiments, the plurality of railyard sensors 206a-206c may comprise additionally or alternatively a proximity sensor (e.g. range finder sensor, pressure sensor) configured to detect a presence of plurality of RCLs 203a-203b.

The control system 200 also includes a server 207 in communication with the plurality of RCLs 203a-203b and the plurality of railyard sensors 206a-206c. The server 207 is configured to generate a database 210 associated with the sets of railcars 204a-204c, 205a-205c based upon the railyard sensor data. The database 210 comprises, for each railcar 204a-204c, 205a-205c, a railcar type value, a railcar logo image, and a vehicle classification value.

The server 207 comprises a processor 214, and a memory 215 coupled thereto. In some embodiments, the server 207 comprises a stand-alone computing device or cluster thereof located remote to the railway yard 201 or on-site for latency reasons. In some embodiments, the server 207 may comprise assigned resources in a cloud computing platform, such as Microsoft Azure, Amazon Web Services, or Google Cloud Platform.

The server 207 is configured to generate selectively control the plurality of RCLs 203a-203b to position the sets of railcars 204a-204c, 205a-205c within the plurality of railroad tracks 202a-202b based upon the railyard sensor data. As will be appreciated, each RCL 203a-203b communicates with the server 207 via the wireless transceiver 212. The controller 213 is configured to transmit a plurality of operational values for the respective RCL 203a-203b to the server 207 to provide snapshot of the current status. For example, the plurality of operational values comprises the geolocation value for the respective RCL 203a-203b, but may include a speed value for the respective RCL, a bearing of the respective RCL, a condition of the respective RCL and associated sets of railcars 204a-204c, 205a-205c, and a weather condition of the railway yard 201.

Also, the server 207 is configured to monitor the plurality of RCLs 203a-203b for railyard traffic violations. In particular, the railyard traffic violations may comprise illegal parking and speeding in the railway yard 201, stop bar violations in the railway yard, safety gear violations in the railway yard, and abandoned/idled objects in the railway yard. Moreover, in some embodiments, the server 207 is configured to monitor the behavior of personnel within the railway yard 201. For example, the server 207 is configured to monitor personnel for safety rule compliance.

The server 207 is configured to identify each railcar 204a-204c, 205a-205c based upon the railyard image data. The server 207 is configured to perform OCR on the railyard image data. The server 207 is configured to perform machine learning on the railyard image data. In particular, the server 207 may be configured to execute a first machine learning model comprising a CNN trained to predict a location of text sequences in the railyard image data. The server 207 is configured to execute a second machine learning model comprising a RNN for scanning the text sequences and predicting a sequence of missing characters.

Yet another aspect is directed to a method for operating a control system 200 for a railway yard 201 with a plurality of railroad tracks 202a-202b. The control system 200 includes a plurality of RCLs 203a-203b and sets of railcars 204a-204c, 205a-205c respectively associated therewith on the plurality of railroad tracks 202a-202b, and a plurality of railyard sensors 206a-206c configured to generate railyard sensor data of the plurality of railroad tracks. The method comprises operating a server 207 in communication with the plurality of RCLs 203a-203b and the plurality of railyard sensors 206a-206c to generate a database 210 associated with the sets of railcars 204a-204c, 205a-205c based upon the railyard sensor data, the database comprising, for each railcar, a railcar type value, a railcar logo image, and a vehicle classification value. The method includes operating the server 207 to selectively control the plurality of RCLs 203a-203b to position the sets of railcars 204a-204c, 205a-205c within the plurality of railroad tracks 202a-202b based upon the railyard sensor data.

One of the most expensive challenges for train companies is maintaining and operating a railroad classification yard. The function of the railroad classification yard is to sort incoming trains in order to build outgoing trains. Within the yard there are rail cars and locomotives; the rail cars provide storage for the cargo to be shipped and the locomotive moves the train from point A to point B. Locomotives are also used to move rail cars within the railroad classification yard. Each of the controlled locomotives are commonly referred to as an RCL. Each RCL in the railroad classification yard typically contains a control module that controls the train's movement either in a forward direction or a backward direction.

The control module also controls the speed at which the train will move. The control system 200 uses VTOS-HE and provides railyard automation (RYA). The VTOS-HE is placed in an RCL and transmits instructions to the control module within the RCL regarding the direction and speed of the RCL. VTOS-HE can receive information from a remote location outside of the RCL and without the intervention of a human operator.

VTOS-HE is compatible with the VTOS system, which monitors the position, direction, and speed of individual rail cars, locomotives, and other debris or objects throughout the rail yard. VTOS-HE continuously utilizes the VTOS system to generate instructions to then be transmitted to its corresponding control module in the RCL. In addition, the VTOS-HE device can be mounted in an existing head end mounting bracket and meets all railroad standards for vibration and environmental regulations.

Furthermore, VTOS-HE will incorporate real time self-checking of all major components and subsystems. It will also have a positive indication of a failure and redundancies will be built into the system to protect against any accidents or catastrophic events.

The VTOS-HE system will incorporate a GPS so that the end user can pinpoint the location of the RCL within the classification yard. This control system 200 is intended to reduce injuries, fatalities, and costs associated with a railroad classification yard. In turn this control system 200 will provide a safer and less costly alternative to the typical approaches.

This control system 200 provides GPS coordinates and wirelessly connects automatically with a VTOS across a railroad classification yard. The railroad classification yard has a multitude of tracks upon which the individual locomotives move throughout the yard. This system will determine and report the speed and direction of a particular locomotive or remote control locomotive (RCL).

With this system it is designed so that locomotive in the classification yard of a railyard are operated remotely without the need for a human being present in the RCL. The VTOS system will use a pole with a light tree that is positioned in the classification yard. The light tree is used with the VTOS system. Additionally a pole with a camera is positioned in the yard to provide images of the yard including any locomotives and will able to document real time movement of individual locomotives in the yard. When the system is fully implemented multiple cameras may be used in the yard as well as multiple light trees.

With this system, control of the RCL is governed by commands from the VTOS-HE system and not by a human operator. Although the potential for human operation of the locomotive may exist, VTOS-HE can override the operator if the instructions are not followed.

VTOS-HE is intended to work in tandem with VTOS 1 when a locomotive is in the yard, approaching the yard, or departing from the yard. Once a locomotive is in either of the three locations VTOS-HE is automatically implemented and will immediately begin wirelessly receiving information from the VTOS system. The VTOS-HE unit is placed in the RCL to transmit information between the VTOS system and the other components of the VTOS-HE system. The information from VTOS will then be computed by VTOS-HE and then an instruction is quickly provided to the control module, provided by the RCL/RCO system. The control module actually controls the function of the locomotive.

Once the control module receives an instruction from VTOS-HE, it then carries out the instruction. For example, VTOS-HE may transmit an instruction to the control module or backhaul to slow down the locomotive 20 to 1 mph. The control module will then slow the locomotive to 1 mph.

In order to give the operator a visual reference a camera is incorporated into the VTOS system in order to provide visual images of the individual RCLs in the classification yard. This camera will operate in all lighting conditions and may include the capability to capture thermal imaging. However, an option is provided that allows an individual to manually override the instruction provided by VTOS-HE and submit his or her own instructions to the backhaul. This individual may be in the train or in a remote location. If an individual overrides VTOS-HE and inputs his or her own instructions or controls the locomotive manually, VTOS-HE will monitor and record how the train is controlled and the speed of the train.

Each locomotive in the yard containing a VTOS-HE system can transmit through VTOS the location of the locomotive it is installed into other VTOS head end units installed in other RCLs in the rail classification yard. The head end units then use that information along with the information provided by VTOS to generate and submit instructions to the corresponding control module in the RCL.

VTOS-HE will also collect mechanical information from the RCL/RCO system and transmit that information through VTOS. This is important for efficiency. If a locomotive has a mechanical malfunction, VTOS-HE will wirelessly transmit such information through VTOS. In turn the correct repairs can be performed quickly. Furthermore, the VTOS-HE can share this information through the VTOS network to other RCLs in the yard. Once informed, the VTOS-HE on other RCLs can instruct the control module accordingly so that a potential collision is avoided.

In addition to VTOS-HE receiving and transmitting information wirelessly, it will also incorporate real time self-checking of all major components and subsystems. It will also have positive indication of a failure and redundancies will be built into the system to protect against any accidents or catastrophic events.

The VTOS-HE system will be able to communicate with the RCL/RCO system via a serial data or TCP/IP communication protocol remotely and determine which track the RCL locomotive is occupying. In order to maximize the security of the system, the information that is transmitted in the VTOS-HE system may be encrypted. Additionally access to the system may be password protected. With this application multiple backhauls and multiple relays may be used to transmit information throughout the yard.

In the following, a discussion of exemplary features that may be included in the tracking system 10, 110 and control system 200 now follows. The purpose of this document is to describe the utilities and capabilities of the IVS and its subservices.

Machine Learning Models 2.1. Stencil Recognition with OCR

The Stencil recognition engine provides OCR to the system. This engine uses two machine learning models in conjunction. The first model is a region-based convolutional neural networks (R-CNN) trained to predict the locations of text sequences in the image. The cropped text from each of these outputs is then given to a specialized RNN, which scans the text and predicts the sequence of characters it sees. This engine handles both horizontally- and vertically-oriented text, enabling it to predict on the text patterns commonly used on intermodal carriers.

2.2. Brand Recognition

The Brand Recognition Engine recognizes the shipper brand of a railcar or trailer. For example, JBHUNT, YRC, FedEx, UPS, etc.

2.3. Asset Type Recognition Engine

The purpose of the Asset Type Recognition Engine is to classify the type of asset. For example, "railcar/railcar container", "container", "trailer", "Chassis", "pickup truck", "bobtail", "hostler", "pedestrian", "worker" etc. In addition to the type of asset, the model also returns a bounding box surrounding the asset in the image.

2.4. Color Engine

The Color engine utilizes and reuses the R-CNN engine's localization to infer the color of the railcar or trailer's face. This engine can use both computer vision and machine learning to achieve this.

Using computer vision, the engine may return the most dominant colors in the cropped image as numeric coordinates in any given color space (e.g. RGB, HSV, YUV, LAB, etc.). Using machine learning, the engine may utilize a CNN trained to predict the dominant color of the image in human-readable form (e.g. "Red", "Blue", "White", etc.).

2.5. PTZ Slot Classification Engine

The PTZ Slot Classification Engine is given an image snapshot from the PTZ camera. The image is then fed to an R-CNN model trained to detect the location and traits of the faces of railcars and trailers. The model also can determine the front and rear ends of the railcars and trailers.

This model aids the system in localizing the contents of the parking spot and classifies the carrier (identified by their logos, if any) and type of asset (See § 2.3). The classifications and especially the locations output by the R-CNN model are able to be used in other parts of the system to filter and/or validate the output predictions from other adjacent engines.

2.6. Unique Visual Characteristics Engine

Detect additional anomalies that may be used to further identify a particular asset, for example, rust or damage, graffiti, etc.

2.7. Weather Analysis Engine

The main purpose of the Weather Analysis Engine is to visually detect weather events that harm the systems operation, for example, heavy rain or fog.

2.8. Travel Direction Engine

The Travel Direction Engine determines the direction that an object is traveling with respect to the camera in an image or series of images.

PTZ Service 3.1. Service Overview

PTZ uses pan-tilt-zoom cameras as a way to survey the yard. Images from these cameras are fed through various engines to be reported to the database.

3.2. Service Operation

PTZ cameras are mounted throughout the yard. Pre-set locations are used to isolate spots to report codes. Each pre-set is meant to correlate to a specific location in the yard. The cameras cycle through their pre-set locations to continuously cycle through the yard's spots, taking a picture at each pre-set location. These pictures are sent to the PTZ Classification Module and OCR engine. After being processed by these engines, the OCR engine's code results are then weighted through the weighting system engines. The weighting engine system results can be filtered through various means. Codes not filtered are reported to the database, corresponding to the current pre-set location. Current filtration systems include:

Classification R-CNN filter: codes read that are not the fronts of railcars are removed from the possible results from the spot in select locations. Priority code selection: codes read that are not central to the image are removed from the possible results. Neighbors Logic: remove codes that have been reported nearby to reduce repetition of codes.

3.3. PTZ Classification Module

The PTZ Classification module uses the PTZ Carrier Classification Engine, Color Engine, and unique visual characteristics engine to provide additional detail of the contents of a slot observed by PTZ, for example, "White JBHUNT with Rusted Top", "Blue Trailer", "Brown Stacked Chassis" etc.

3.4. Stencil Recognition with OCR (See § 2.1).

3.5. Weighting

System for assigning confidence (weight) to OCR read codes of railcar stencils.

Weight—Value representing the likelihood of a correct code match.

OCR—Engine that takes images of characters and produces text representative of what the engine reads.

Prefix—The first four values of a railcar code/stencil.

3.5.3. Inputs

OCR code—A code read by the OCR engine, from images provided by a camera. Current Inventory—A list of railcar codes in the yard obtained from the Database. Model Carrier Prediction—A prediction from a machine learning model that is designed to predict carriers. The model carrier prediction is then mapped to common carrier prefixes which are used in the stencil engine system.

Weighting will be composed of eight steps (Engines 1-8). Each step will attempt to provide a weight for an OCR generated code. If a step is successful, the weight, matched code and accompanying reasons list is returned, at which points the remaining steps will not occur. If it is not successful it continues onto the next step. In most cases, the OCR code is compared against the current inventory. Weighting/confidence values are variable to customer needs. Names are provided as a shorthand for the operations the engine performs. If no engine is successful in performing a match, a weight of zero is assigned, with the failure reasons of each engine attached.

3.5.5. Engine 1: Exact Match

In this step, the OCR code is shortened to the first ten characters (or length of current inventory). It is then compared against a list of codes in current inventory. If the code matches exactly with any code in the inventory, this step is successful. The input is shortened, as the current inventory codes are stored as ten digit codes. On success: Returns a list of reasons that contains only an exact match confirmation. Returns the exact matching string. On failure: Reasons list adds an exact match failure description.

3.5.6. Engine 2: Unique Numbers Match

In this step, the OCR code's numbers, except the check digit are compared against the numbers in the current inventory. If there is only one match then this step is successful. On success: Returns a list of reasons that contains an exact match failure and a unique numbers match success description. Returns the unique matching string. On failure: List adds a unique numbers match failure description.

3.5.7. Engine 3: ML Prefix Augmentation

If the model carrier prediction is not empty, then the carrier prediction is correlated to a list of known carrier prefixes. If the shortened OCR code (the code without check digit), matches in nine out of ten of its values to a code in the current inventory, the carrier prefix list is used to substitute the OCR code's original prefix. Only prefixes within one character difference are attempted. If this creates an exact match in the inventory this step is successful. On success: returns a list of reasons that contains an exact match failure a unique numbers match failure and an ML Prefix Augmentation success description. Returns the matching string after augmentation. On failure, list adds an ML Prefix Augmentation failure description.

3.5.8. Engine 4: ML Prefix Replacement

If the model carrier prediction is not empty, then the carrier prediction is correlated to a list of known carrier prefixes. The carrier prefix list is used to substitute the OCR code's original prefix. Only prefixes within one character difference are attempted. If this creates an exact match in the inventory this step is successful. On success: returns a list of reasons that contains an exact match failure, a unique numbers match failure, an ML Prefix Augmentation failure description, and an ML Prefix Replacement success. Returns the matching string after Replacement. On failure: List adds an ML Prefix Replacement failure description.

Engine 5: Code Off by One

If the shortened OCR code (the code without check digit), or the full ISO code matches in all but one of its characters to a code in the current inventory, this step is successful. On success, returns a list of reasons that contains failure reasons for above steps and a code off by one match success. Returns the matching string. On failure, list adds a code off by one match failure description.

Engine 6: Numbers Only Match

If the OCR code's numbers (excluding the check digit) are an exact match in the inventory, this step is successful. On success, returns a list of reasons that contain failure reasons for above steps and a numbers only match success. Returns the full OCR code read without any modifications. On failure, list adds a numbers only match failure description.

3.5.11. Engine 7: ISO Check

If the code is compliant with ISO_6346, this step is successful. On success, returns a list of reasons that contain failure reasons for above steps and an ISO check success. Returns the full OCR code read without any modifications. On failure, list adds an ISO Check failure description.

3.5.12. Engine 8: Prefix Match

If the prefix of the OCR code matches any prefix in the inventory, this step is successful. On success, returns a list of reasons that contain failure reasons for above steps and an ISO check success. Returns the full OCR code read without any modifications. On failure, list returns all failure reasons encountered.

3.5.13. Stencil Engine Examples

Each example case is followed by the engine that successfully handles the case. Code Read represents a stencil code read through OCR. All examples use this sample current inventory of the following codes: ABCD123456; QWER123457; WASD123457; and SWRU234567.

Example Case 1: Engine 1

Code Read: ABCD123456
Match Condition: Exact string found in inventory.
Code Returned: ABCD123456
Explanation: The exact string exists in the inventory. Meeting criteria for Engine 1.

Example Case 2: Engine 2

Code Read: WASD123456
Match Condition: Unique Numbers Match.
Code Returned: ABCD123456
Explanation: There is only one code in the current inventory with the numbers 123456.
Meeting criteria for Engine 2.

Example Case 3: Engine 3

Code Read: KWER123457
Machine Learning Prediction: railcar prefixes: QWER, DDCD.
Match Condition: ML Prefix Augmentation.
Code Returned: QWER123457
Explanation: There is a code that is one value off of our prediction. After replacing with prefix QWER there is a match. QWER123457 is the only one in range to try replacement. Meeting criteria for Engine 3.

Example Case 4: Engine 4

Code Read: KPER123457
Machine Learning Prediction: railcar prefixes: QWER, DDCD.
Match Condition: ML Prefix Replacement.
Code Returned: QWER123457
Explanation: There is no code that is one value off of our prediction. After replacing with prefix QWER there is a match. QWER123457 and DDCD123457 are both attempted to be matched against inventory. Meeting criteria for Engine 4.

Example Case 5: Engine 5

Code Read: KWER123457
Machine Learning Prediction: railcar prefixes: NONE
Match Condition: Code Off by One.
Code Returned QWER123457
Explanation: There is a code that is one value off of our prediction. There are no railcar prefixes to attempt to match with. The code is off by one from QWER123457. Meeting criteria for Engine 5.

Example Case 6: Engine 5

Code Read: KWER123457
Machine Learning Prediction: railcar prefixes: ABCD, WART
Match Condition: Code Off by One.
Code Returned: QWER123457
Explanation: There is a code that is one value off of our prediction. There are no matches after attempting prefix replacement. The code is off by one from QWER123457. Meeting criteria for Engine 5.

Example Case 7: Engine 5

Code Read: SWRU234568
Machine Learning Prediction: railcar prefixes: NONE
Match Condition: Code Off by One.
Code Returned: SWRU234567
Explanation: There is a code that is one value off of our prediction. There are no railcar prefixes to attempt to match with. The code is off by one from SWRU234567. Meeting criteria for Engine 5.

Example Case 8: Engine 6

Code Read: TYUI123457
Machine Learning Prediction: railcar prefixes: NONE
Match Condition: Numbers only match.
Code Returned: TYUI123457
Explanation: There is one match that has exactly the same numeral values. No railcar prefixes to attempt a match with. Sending read code. Meeting criteria for Engine 6.

Example Case 9: Engine 7

Code Read: CSQU3054383
Machine Learning Prediction: railcar prefixes: NONE
Match Condition: ISO Valid.
Code Returned: CSQU3054383
Explanation: The code read is an ISO valid code. Meeting criteria for Engine 7.

Example Case 10: Engine 8

Code Read: WASD3054383
Machine Learning Prediction: railcar prefixes: NONE
Match Condition: Prefix in inventory.
Code Returned: WASD3054383
Explanation: The code matches a prefix in current inventory. Meeting criteria for Engine 8.

Example Case 11: None

Code Read: WWW3054383
Machine Learning Prediction: railcar prefixes: NONE
Match Condition: NONE
Code Returned: NONE
Explanation: The code has not met any weighting conditions. Meets no engine criteria.

Choke Service 4.1. Service Overview

The Choke Service takes advantage of cameras set up at several "choke points" throughout the yard. Choke cameras are set up at entrances and exits to rows, and are sometimes also setup at various positions within a given row. The main idea of choke is to detect assets entering and leaving a particular section of the yard in order to gain further awareness of the movements and locations of assets. Choke cameras capture images of assets as they drive by and analyze the images to better understand the asset. Overall, the idea is for choke to understand, as deeply as possible, each asset that drives by.

4.2. Service Operation 4.2.1. Choke Camera

Wait for an object to enter the field of view. Capture a sequence of raw images while the object is in view. The sequence should start approximately at the time the object enters the view, and end at approximately the time the object leaves the view. Encode and save the sequence to filesystem storage. Send image sequence and relevant object detection information to the "choke consumer" for further analysis.

4.2.2. Choke Consumer

Wait for a sequence of images from the choke consumer. Send the image sequence to the Choke Classification Engine (See § 4.3) to detect relevant information regarding the assets in the image sequence. Stencil recognition with OCR: the sequence of images is sent to the OCR engine which returns all text strings found in the sequence of images as well as the bounding box of the detected text in image coordinates. (See § 2.5).

Background Asset Detection: many of the scenes viewed by the choke cameras contain stationary assets that should be ignored by choke. These are referred to "background assets". Currently, background assets are detected based on the position of the OCR bounding box. However, additional methods including machine learning can be used as well.

Weighting: Strings return from OCR are sent to "weighting" the primary purpose of weighting is to match (potentially incomplete or slightly erroneous) OCR results to actual "current inventory" assets. (See § 3.5).

Direction analysis: currently a variety of methods are used to determine the direction the vehicle is traveling with respect to the camera. Object detection information from the camera is used to infer the direction of travel. If known, the previous location of the asset is also used to infer direction. For the travel direction engine. (See § 2.7). Publish all information gathered about the asset to our internal database and send a "Choke-Point" message to the customer via a restful API.

4.3. Choke Classification Engine

In this stage, a combination of models are used to form a more detailed description of the asset. The Asset Type Recognition Engine in combination with the Color Engine, Brand Recognition, and the Unique Visual Characteristics Engine create a detailed qualitative description of the asset. For example, "Gray FedEx railcar, no rust or damage, carried by a Black Bobtail", "Red Trailer with No Logo, carried by a Yellow Hostler", "White JBHUNT with a Rusted Top carried by a Blue Bobtail" etc.

4.4. Weighting

Engine 1: (See § 3.6.5).
Engine 2: (See § 3.6.6).
Engine 5: (See § 3.6.9).

Occupancy Service

Identifies the occupancy status of each spot in the intermodal yard. Occupancy R-CNN is robust in adverse weather and light conditions.

5.2. Service Operation

PTZ camera programmatically moves from one preset to another to cover different sections of the yard. PTZ camera snaps the Image for each preset. It also retrieves predefined box coordinates for that preset from the database which are sent to the occupancy module. The occupancy module is a trained R-CNN on specific images meant for determining if the spot is occupied. This module detects every railcar in the image and extracts coordinate positions of each railcar in a rectangular shape. Predicted boxes along with retrieved preset boxes are sent to mapping module.

Mapping module maps the predicted box to the known box to find the correct spot id of each detected railcar. Spots with mapped railcar box is labelled as occupied otherwise unoccupied.

5.3. Preparing Presets

Presets are taken in an optimized way to ensure minimum overlapping of spots exist between two consecutive presets. In case, multiple cameras from different poles can potentially cover the same region, pole with better coverage is given preference. Once preset is decided, every spot within preset was labeled with a spot id and a rectangular box covering the spot. Finally, this is repeated for each preset in different light and weather conditions to ensure robustness in varied weather conditions.

5.4. Object Detection Algorithm

R-CNN machine learning algorithm is trained to detect the railcars from images. Given an input image, it detects all the relevant object with their location in the image. The R-CNN algorithm is trained over thousands of training images with the goal of detecting railcars in input image with their locations.

5.5. Mapping Algorithm

Mapping algorithm consists of two sub-algorithms, drift-fix and rules to assign spots with occupancy decision (occupied/unoccupied). The drift-fix algorithm aligns the predicted boxes against the preset boxes by performing grid search. Search deemed successful when average Intersection over Union (IOU) of given image is greater than a predefined threshold value. Once drift is fixed, various rules are written to determine which spots are occupied. These rules are primarily based on the distance between predicted and ground truth box, and their IOUs. Spots that pass through occupancy logic are either labelled as occupied or unoccupied.

Choke-Occupancy Service

The choke occupancy service combines the functionality of the choke service and the occupancy service to monitor areas that the PTZ service cannot.

6.2. Service Operation 6.2.1. Tracking Camera Engine

The tracking camera engine monitors the region monitored by Choke Occupancy from a high level view. The purpose of the Tracking Camera Engine is to monitor vehicle traffic in the region to provide additional context to choke occupancy, such as the visual description (e.g. White JBHUNT carried by a Black Bobtail) as well as behavior and position information. An example output may be "Black UPS carried by a Black Bobtail drove straight through the region and did not park", "White JBHUNT carried by a Blue Bobtail pulled over but did not park", "Yellow Hostler picked up a Blue Amazon Trailer and left the Region". Additionally, GPS data of the vehicle path is provided to further assist the Choke Occupancy Association Engine. All of the information from the Tracking Camera Engine supplements the choke and occupancy information to form a more complete picture of the events that take place in the region.

Operation: the tracking camera uses a static view to track and describe vehicles as they move through the region.

Events are reported to the database to help choke occupancy narrow down potential matches between choke events and occupancy events. In some cases multiple cameras are required to monitor one Region, so the Tracking Camera Service is also prepared to synthesize data from multiple adjacent cameras, for example, a tracking data from one camera can be combined with tracking data from another camera to form a complete description of the objects path.

6.2.2. Choke Occupancy Association Engine

Each region is monitored by a choke region occupancy monitor that corresponds to a segment of the yard. A region monitor periodically associates choke events (passing assets) to occupancy changes using the following the steps. First, the database is queried for the choke events and occupancy changes for the current region. The database is queried for all tracking camera service events around the time of the choke and occupancy events. The next step is to disregard choke results that are younger than a determined minimum age, which are those that are unlikely to have already parked based on the time elapsed between the occupancy change and the choke event, as well as the distance from the choke camera to the spot.

The next step is to evaluate the compatibility of each choke result with each occupancy change using a combination of features including the color, brand, and additional characteristics of the railcar determined from choke and tracking. The time of the occupancy change and choke result are also considered, as well as the distance from the choke camera and the occupancy change. Tracking information is also considered, such as the path taken by the vehicle and whether or not the vehicle stopped, parked, or left the region. These considerations are used to create the best (lowest overall match cost) between the choked assets and known occupancy changes and reported to the database. Some choke occupancy regions do not have complete occupancy coverage. The following regions use a separate set of steps to associate choke events to the region. Query the database for the choke events for the current region. The next step is to disregard choke results that are younger than a determined minimum age. The remaining choke results are considered parked in the region and are assigned to every spot in the region.

Automatic Gate Service (AGS)

Identify characteristics of an incoming asset from the gate and associate the characteristics to that asset before adding it into inventory and allowing the asset to pass into the yard. Static cameras are set up at the entry gate to focus on areas of interest for incoming assets. Chassis Camera: lower portion of the asset where chassis codes are normally found. Truck Camera: front portion of the side of the asset where the truck is normally found. Railcar Camera: back portion of the side of the asset where the railcar/trailer is normally found. Top Camera: top of the asset to inspect the top of the railcar. Rear Camera: rear of the asset where the door to the railcar/trailer are normally located. Driver Camera: focused where a truck driver would normally found. As an asset approaches the entry gate, it is forced to stop in view of the camera system.

Image from Chassis camera is classified by the following engines: Assert Type Recognition (See § 2.3); Stencil Recognition with OCR (See § 2.1); Image from the Truck Camera is classified by the following engines; Assert Type Recognition (See § 2.3); Stencil Recognition with OCR (See § 2.1).

Image from the railcar Camera is classified by the following engines: Assert Type Recognition (See § 2.3); Stencil Recognition with OCR (See § 2.1); Color (See § 2.4); Brand Recognition (See § 2.2); and Unique Visual Characteristics (See § 2.6).

Image from the Top Camera is classified by the following engines: Stencil Recognition with OCR (See § 2.1); and Unique Visual Characteristics (See § 2.6). Image from the Rear Camera is classified by the following engines: Stencil Recognition with OCR (See § 2.1); Brand Recognition (See § 2.2); and Unique Visual Characteristics (See § 2.6).

Image from the Driver Camera is simply stored in image data store. These characteristics are associated to the incoming asset and the asset is added to the current yard inventory. The AGS system determines where the asset should be parked and informs the driver of where to park. The asset is then allowed to pass into the yard in order to park where instructed.

Security and Safety Service

The security and safety service identifies instances of employees and other individuals performing actions that are deemed harmful to the intermodal operation.

8.2.1. Speeding

Position the camera so that the field of view contains a large enough portion of the area of interest. Determine the two speeding alarm zones. These alarm zones are positioned at opposite sides of the field of view. Stream video frames from the camera while determining and tracking objects in the scene using object detection and tracking algorithms. Monitor object detections and alarm zones to determine speeding violations.

A speeding violation is determined by the following criteria: the object detection has entered both alarm zones; the difference between the before alarm zone time and the after alarm zone time for the object detection is within the specified threshold; and the time threshold is determined by the position of the camera and the speed limit in the monitored area.

8.2.2. Stop Bar

Position the camera so that the stop bar line is located at the opposite end of where the monitored vehicles enter the field of view. Determine the before and after stop bar alarm zones. The before alarm zone is positioned at the vehicle entrance point in the field of view. The after stop bar alarm zone is positioned between the stop bar and the end of the field of view. Stream video frames from the camera while determining and tracking objects in the scene using object detection and tracking algorithms. Monitor object detections and alarm zones to determine stop bar violations. A stop bar violation is determined by the following criteria: the object detection has entered both alarm zones; the object detection entered the before alarm zone prior to the after alarm zone ensuring correct direction; the difference between the before alarm zone time and the after alarm zone time for the object detection is within the specified threshold; and the time threshold is determined by the position of the camera and the speed at which the detection should pass between both alarms.

Database

The design of the database is crucial for all the modules due to the fact that it works as a repository for the configuration, information being generated by the applications and logs as well. A proper design requires for the database for the server to get response times less than a second for any of the request of the multiple modules.

Figure 9A:
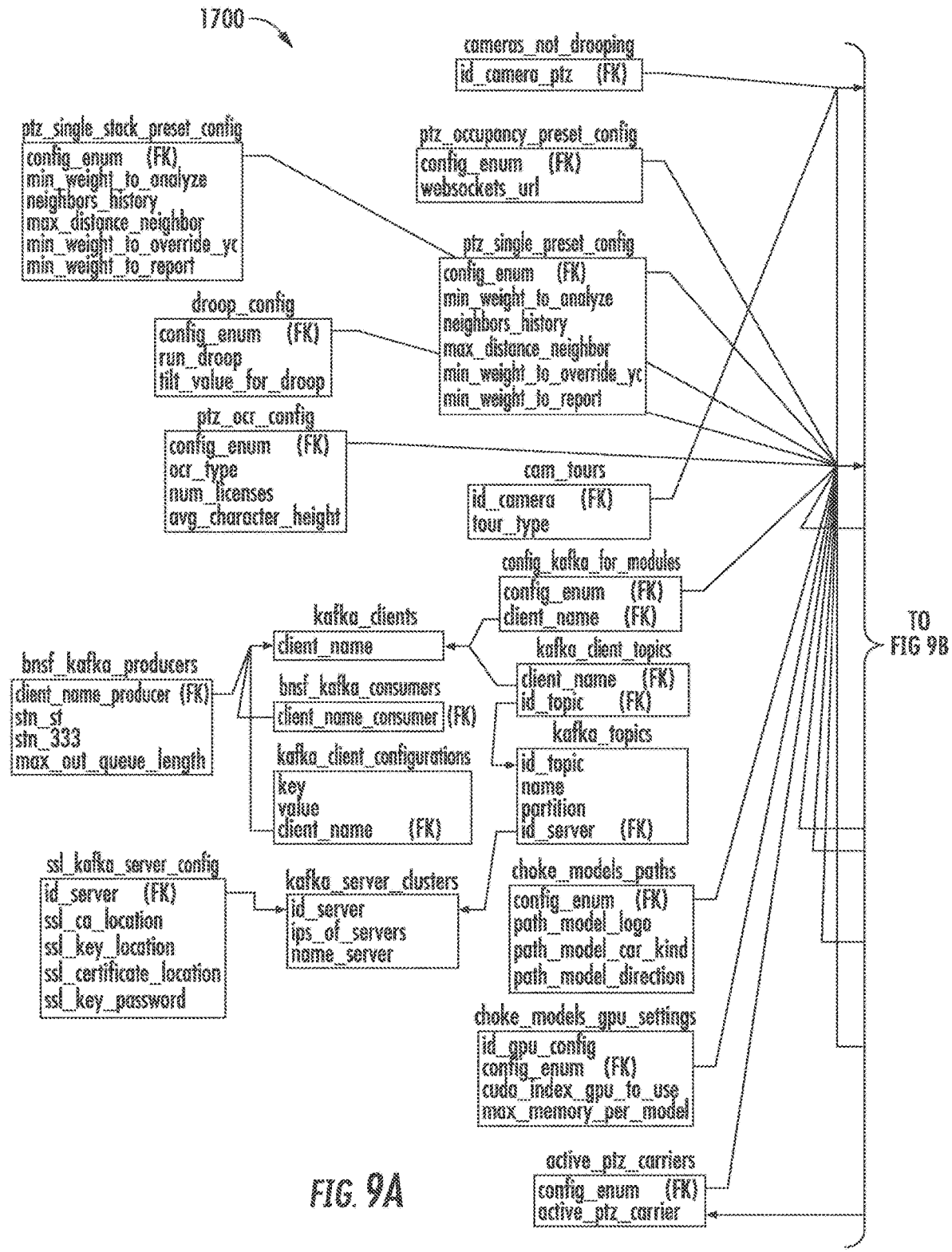
FIGS. 9-12 are diagrams showing operating of the first example embodiment of the tracking system.
Figure 9B:
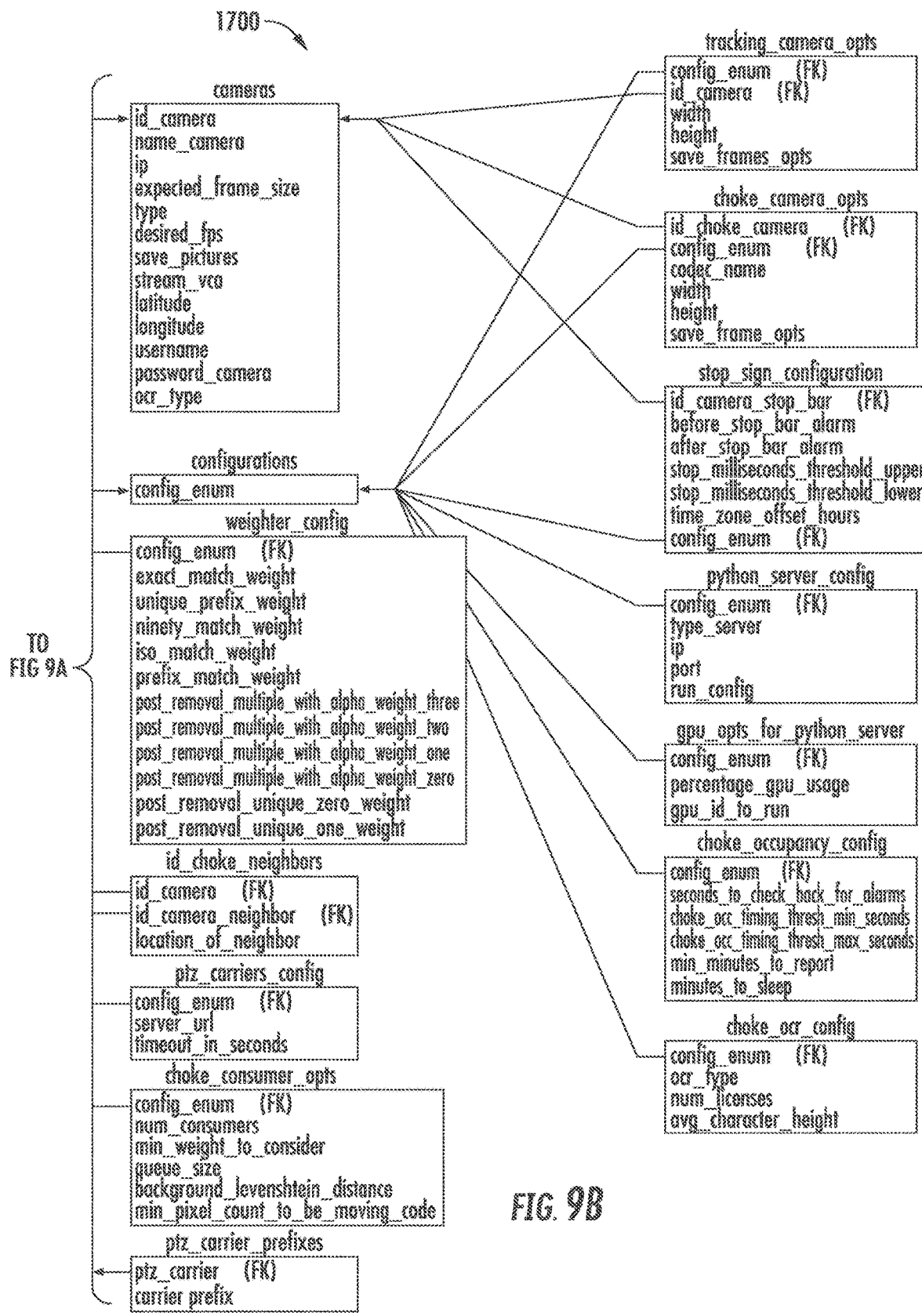
Figure 10A:
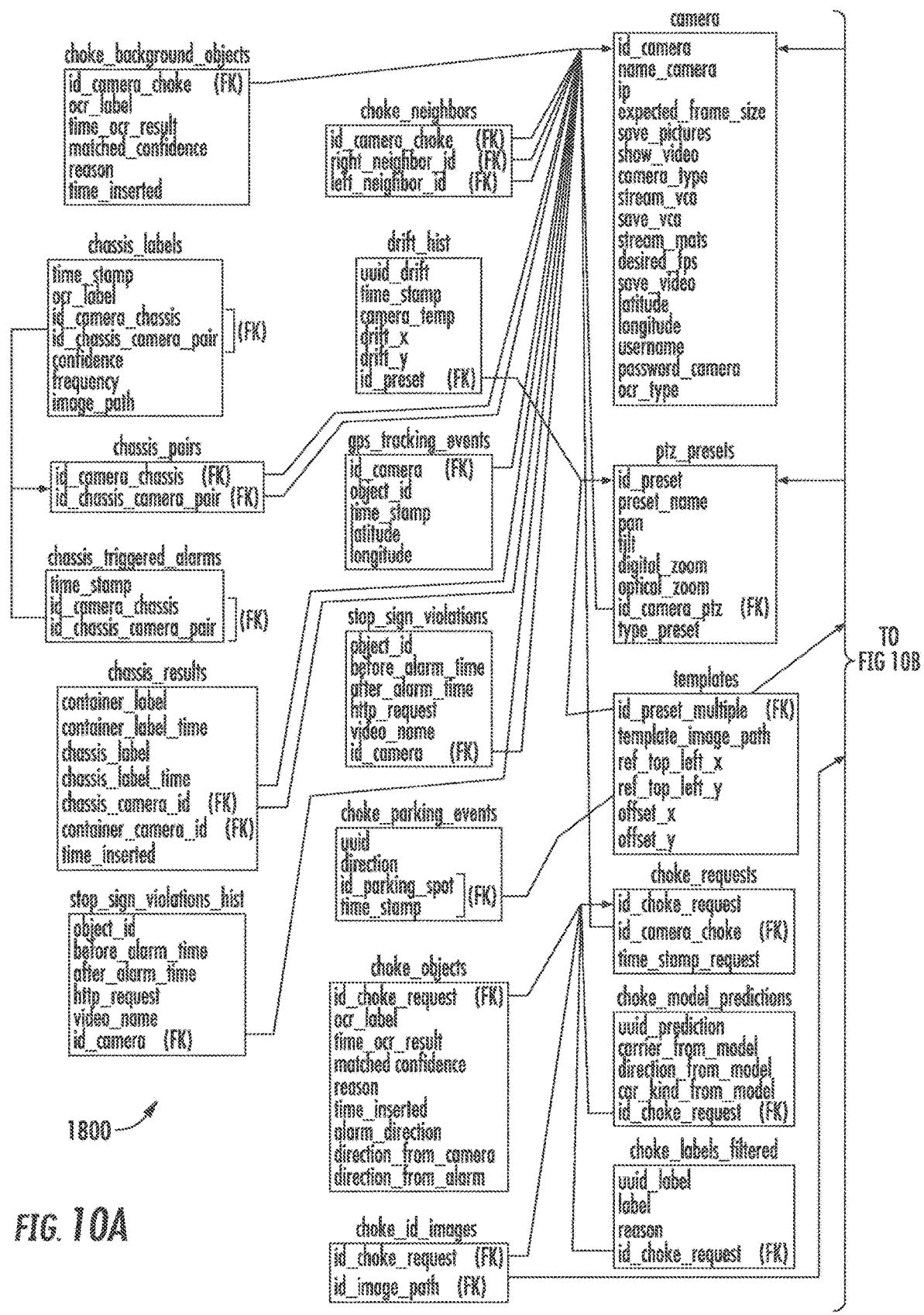
Figure 10B:
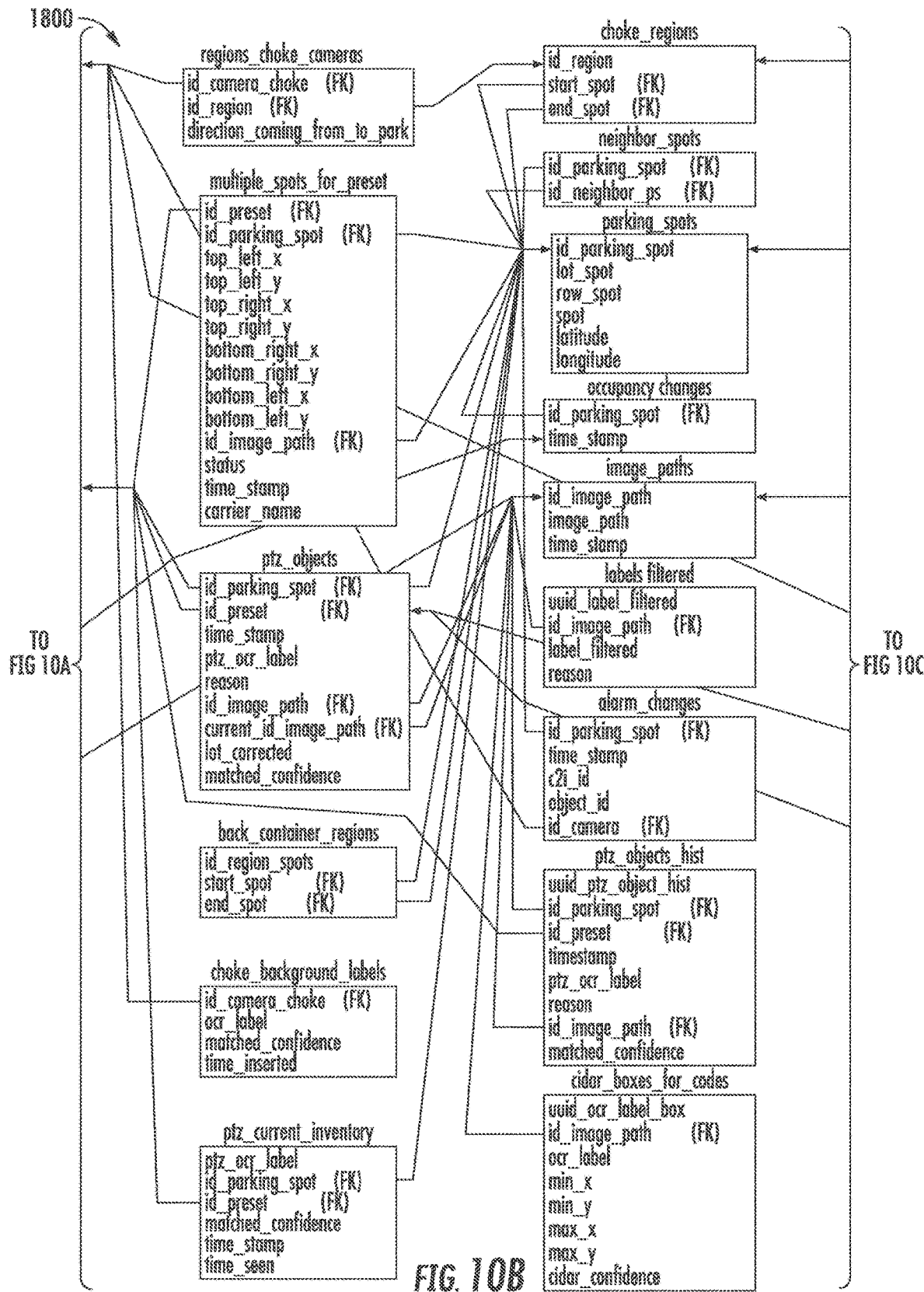
Figure 10C:
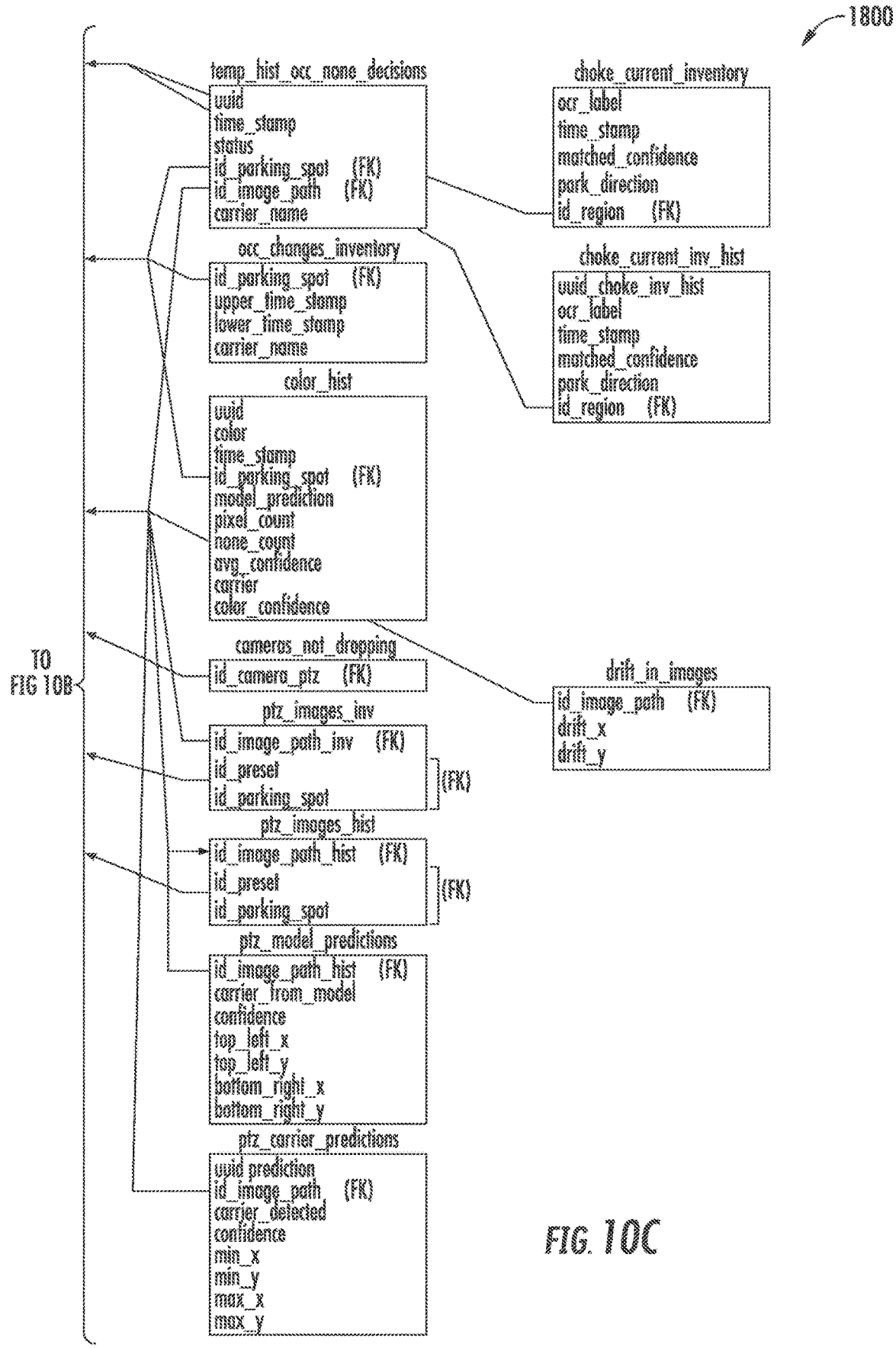
Figure 11:
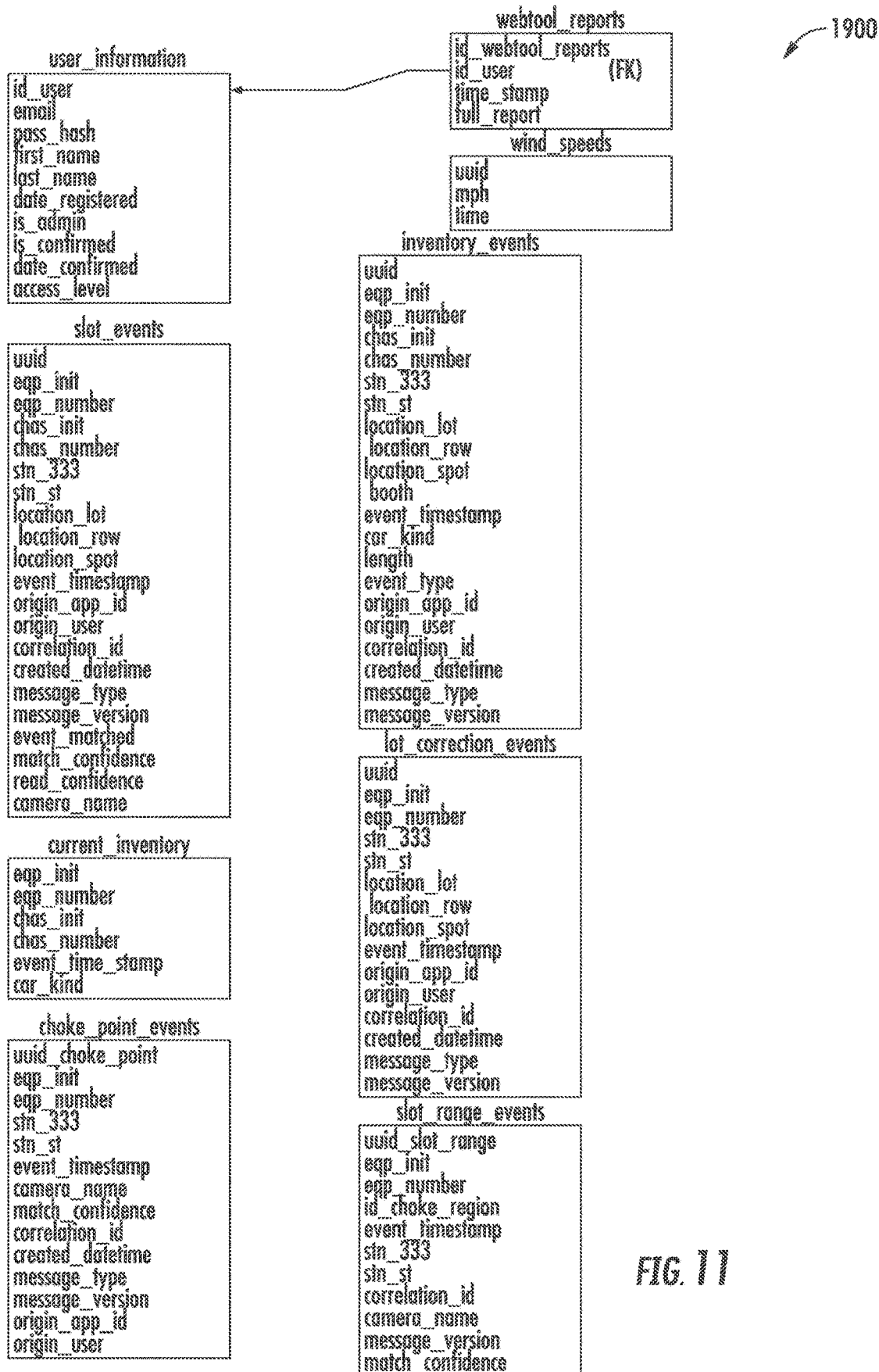

The following is the schema diagrams for the different modules in the database: Configuration schema diagram 1700 in FIG. 9; Module's information schema diagram 1800 in FIG. 10; logs diagram 1900 in FIG. 11. It should be appreciated that these schemas may change over time.

Figure 12:
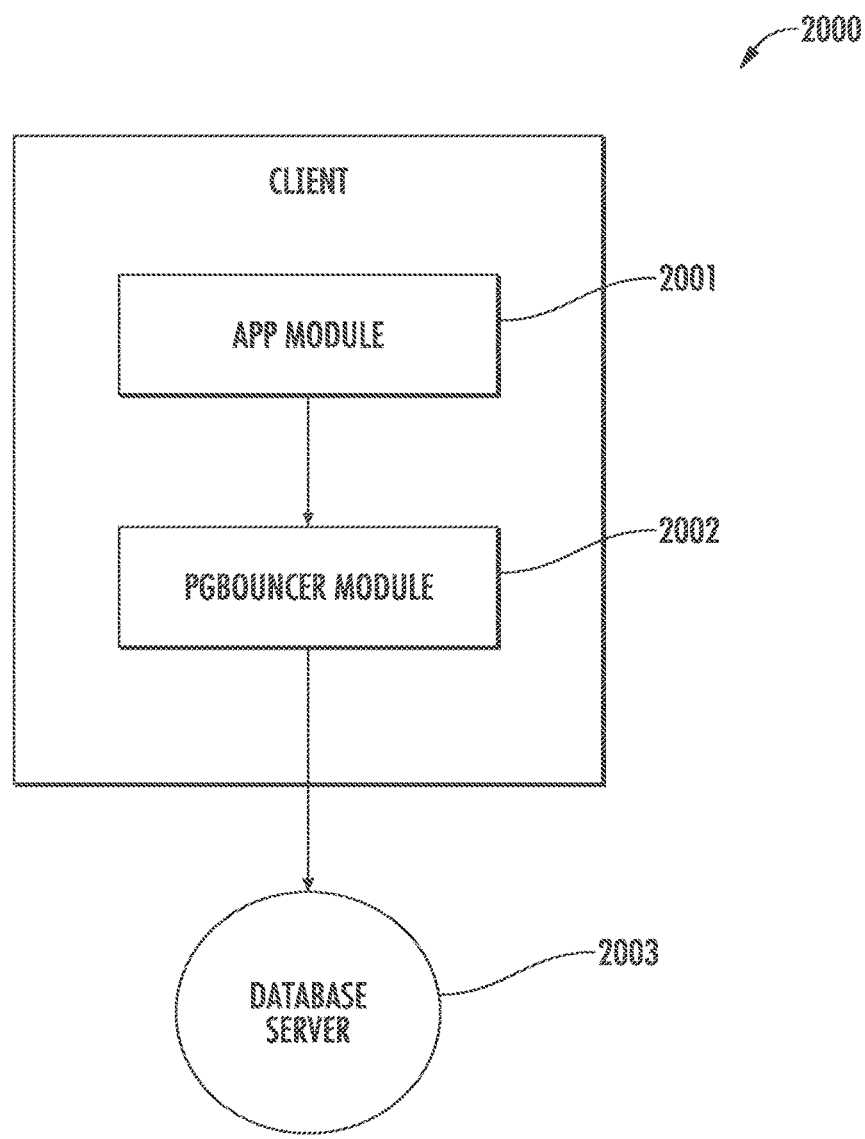

Infrastructure: in order to achieve the requirements for the database service, a layout like the following is put in place for any module: The client 2000 represents the system in which our application run: (FIG. 12). In this case, this are multiple virtual environments. The app module 2001 represents each individual module from where the information is being produced and consumed. The PgBouncer module 2002 is a proxy that routes the connections of the app module 2001 to and from the database server 2003. The proxy manages the multiple connections in a faster and smarter way adding an extra layer of security due to the fact that the database is hidden from the app side. The database represents the virtual environment where the database service is running handling the connections being produced by the proxy PgBouncer module 2002.

In container terminals, an accurate inventory is the baseline requirement for building efficiencies, increasing productivity and velocity within a Yard or Distribution facility. The traditional approach to update and track inventory movement is to deploy "Yard Checkers" to drive through the facility and record the location and ID of the inventory. This approach increases exposure to the risk of accidents as the Yard Checker is recording data while in a moving vehicle. This manual process is slow, costly and inventory becomes stale minutes after the data is input. Accurate inventory may be required to develop an effective load plan, improve the driver experience, and provide meaningful data for a Transport Management System (TMS) and a Terminal Operating System (TOS).

Figure 14:
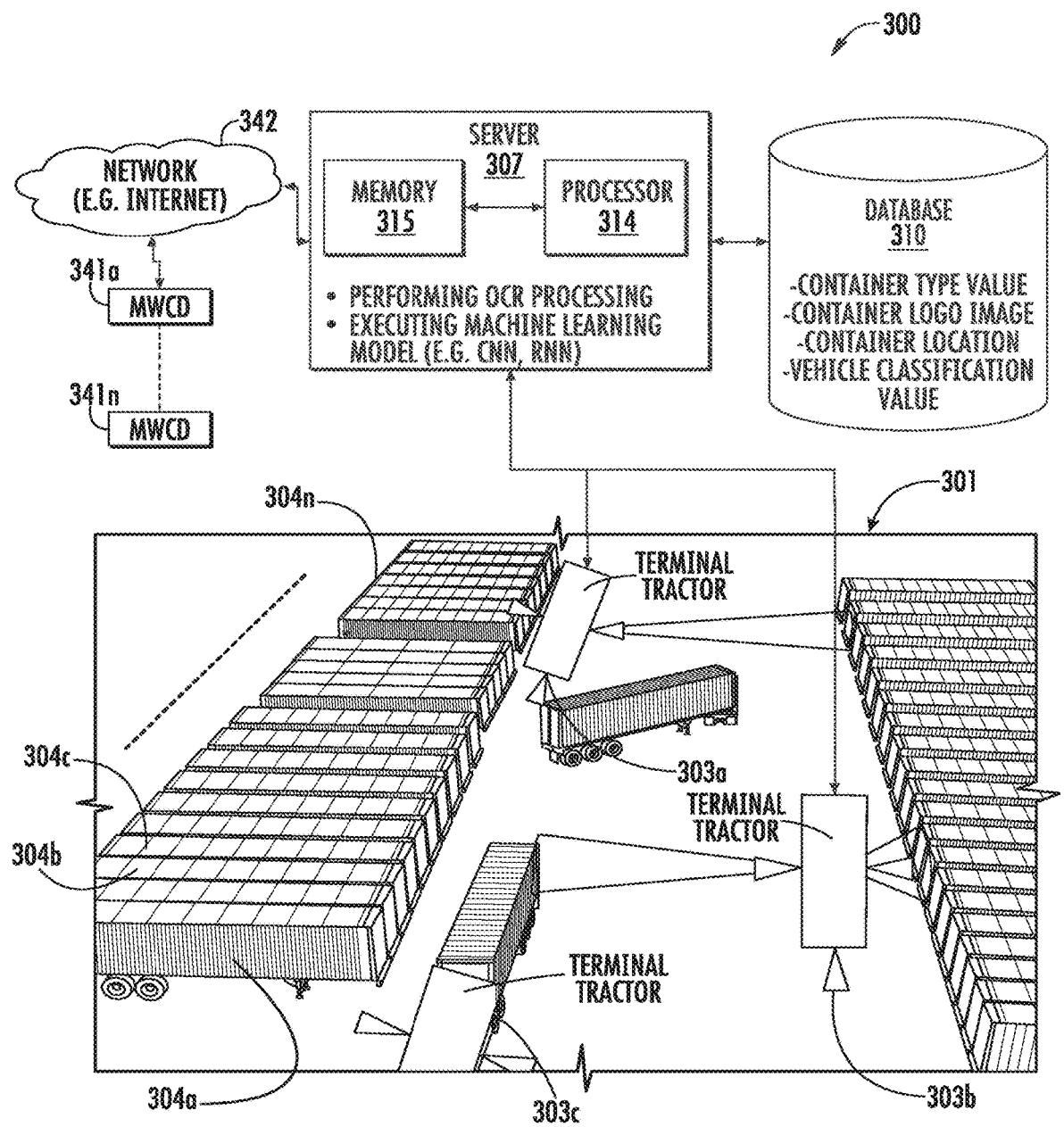
FIG. 14 is a schematic diagram of a control system, according to a third example embodiment of the present disclosure.
Figure 15:
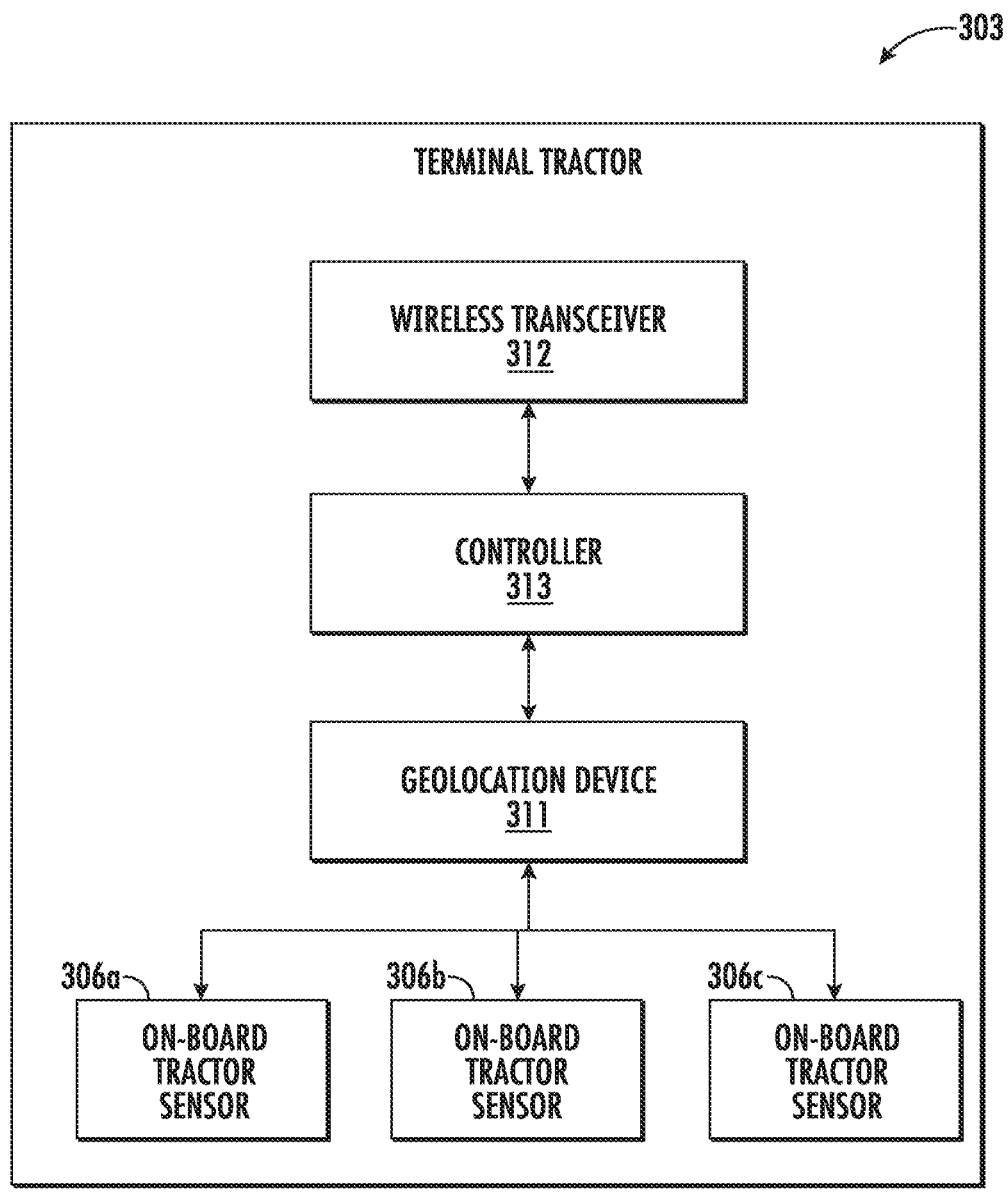
FIG. 15 is a schematic diagram of a terminal tractor in the control system of FIG. 14.

Referring now to FIGS. 14-15, another embodiment of the control system 300 is now described. It should be appreciated that the features of the above described control system 200 for the railway yard 201 may be incorporated into the control system 300. In this embodiment of the control system 300, those elements already discussed above with respect to FIG. 13 are incremented by 100.

This control system 300 is for a container terminal 301 with a plurality of containers 304a-304n therein. The control system 300 comprises a server 307 having a processor 314, and a memory 315 coupled thereto. In some embodiments, the server 307 comprises a stand-alone computing device or a cluster thereof located remote to the container terminal 301 or on-site to reduce latency and bandwidth consumption. In some embodiments, the server 307 may comprise assigned resources in a cloud computing platform, such as Microsoft Azure, Amazon Web Services, or Google Cloud Platform, for example.

The control system 300 illustratively comprises a plurality of terminal tractors 303a-303c operable within the container terminal 301. As will be appreciated, each of the plurality of terminal tractors 303a-303c may carry one or more containers within the container terminal 301 or transport them outside the container terminal. Also, each terminal tractor 303a-303c may be operated by an onboard driver, may be remote controlled by the driver, or may be fully/partially autonomous.

In the illustrated embodiment, the plurality of terminal tractors 303a-303c numbers three for illustrative clarity. It should be appreciated that the control system 300 may comprise a single terminal tractor in some applications, or a larger number in other applications.

As perhaps best seen in FIG. 15, the terminal tractor 303a-303c comprises a plurality of onboard tractor sensors 306a-306c configured to generate sensor data of at least some of the plurality of containers 304a-304n, a geolocation device 311 (e.g., GPS receiver) configured to generate a geolocation value for the terminal tractor, a wireless transceiver 312, and a controller 313 coupled to the plurality of onboard tractor sensors, the geolocation device, and the wireless transceiver. For example, the wireless transceiver 312 may comprise a cellular transceiver, or a WLAN transceiver (e.g. WiFi, WiMAX).

During operation, the terminal tractor 303a-303c traverses the container terminal 301 (i.e. moving, loading, and unloading containers) and within line of sight of some or potentially all of the containers 304a-304n (i.e. drives by and is visually exposed thereto). When the containers 304a-304n are scanned, the controller 313 is configured to generate image sensor data for the containers 304a-304n along with associated geolocation data tagged therewith.

The controller 313 is configured to transmit the sensor data and the geolocation value (while generating the sensor data) for the terminal tractor 303a-303c to the server 307. The server 307 is in communication with the terminal tractor 303a-303c and is configured to generate a database 310 associated with the sensor data. The database 310 may comprise, for each container 304a-304n, a container type value, a container logo image, and a vehicle classification value. In short, the database 310 comprises an inventory of the plurality of containers 304a-304n in the container terminal 301. Helpfully, this inventory is updated in real time based upon the data feed from the plurality of terminal tractors 303a-303c.

In some embodiments, the plurality of onboard tractor sensors 306a-306c may comprise an image sensor configured to generate container image data. In the illustrated example embodiment, the plurality of onboard tractor sensors 306a-306c is directed to rearward, left, and right. In other embodiments, an additional onboard tractor sensor may be directed frontward to provide 360° coverage. Of course, in some embodiments where cost and bandwidth are limited, the terminal tractor 303a-303c may have less onboard tractor sensors.

For example, each onboard tractor sensors 306a-306c may comprise a high resolution video sensor (e.g. 4 k video sensor). In an advantageous embodiment, one or more of the plurality of onboard tractor sensors 306a-306c may comprise a FLEXIDOME IP starlight 8000i (as available from Robert Bosch LLC). This 2 megapixel performance line camera offers high performance and high dynamic range with 1080 p resolution to provide crisp and highly detailed images even in extreme low-light situations. The capture frequency may comprise 60 frames per second, for example, which provides for optimum performance in fast action scenes that makes sure no critical data is lost and video is captured with excellent detail. In another exemplary application, one or more of the plurality of onboard tractor sensors 306a-306c may comprise a FLEXIDOME IP panoramic 7000 megapixel (as available from Robert Bosch LLC), which is a discreet, aesthetic, low-profile camera for indoor/outdoor use. The 12 megapixel sensor operating at 30 frames per second provides full panoramic surveillance with complete area coverage, fine details and high speeds. The camera offers full situational awareness and simultaneous PTZ views in high resolution.

In some embodiments, the plurality of onboard tractor sensors 306a-306c may comprise a proximity sensor configured to detect a presence of plurality of containers 304a-304n. The proximity sensor may comprise a range finder sensor providing a linear distance to the detected object. The controller 313 is configured to bundle this range data along with the container image data and the geolocation data. The server 307 may use this data to extrapolate an estimated geolocation for each detected container.

Also, the plurality of onboard tractor sensors 306a-306c may comprise a plurality of image sensors configured to generate a plurality of container image data streams. The server 307 may be configured to merge the plurality of container image data streams.

The container image data may comprise container video data, and the server 307 may be configured to weight detected objects in the container terminal 301 based upon a number of frames including the detected objects. The server 307 may be configured to identify each container 304a-304n based upon the container image data. The server 307 may be configured to perform OCR on the container image data. The server 307 may be configured to perform machine learning on the container image data. The server 307 may be configured to execute a first machine learning model comprising a CNN trained to predict a location of text sequences in the container image data. The server 307 may be configured to execute a second machine learning model comprising an RNN for scanning the text sequences and predicting a sequence of missing characters. In some embodiments, the server 307 may use DeepStream technology to provide the maximum speed of processing high frame rate images.

In the illustrated embodiment, the control system 300 comprises a plurality of mobile wireless communications devices 341a-341n (e.g., cell phones, tablet computing devices) in communication with the server 307 via a network 342 (e.g. the Internet or a local secure network). The server 307 is configured to provide the plurality of mobile wireless communications devices 341a-341n with access to the inventory stored within the database 310.

In some embodiments, the control system 300 comprises additional sensors on fixed locations. In some applications, the additional sensors may be deployed at exit/entry points for the container terminal 301. Also, the additional sensors may be deployed on Rubber Tired Gantry Cranes (RTG) to capture containers being loaded into and out of the container terminal 301, for example, from docked container ships.

Yet another aspect is directed to a method of operating a server 307 in a control system 300 for a container terminal 301 with a plurality of containers 304a-304n therein. The control system 300 comprises a terminal tractor 303a-303c operable within the container terminal 301 and comprising a plurality of onboard tractor sensors 306a-306c configured to generate sensor data of at least some of the plurality of containers 304a-304n, a geolocation device 311 configured to generate a geolocation value for the terminal tractor 303a-303c, a wireless transceiver 312, and a controller 313 coupled to the plurality of onboard tractor sensors, the geolocation device, and the wireless transceiver. The method comprises operating the server 307 in communication with the terminal tractor 303a-303c to receive the sensor data and the geolocation value for the terminal tractor from the terminal tractor, and generate a database 310 associated with the sensor data, the database comprising, for each container 304a, a container type value, a container logo image, and a vehicle classification value.

Advantageously, the control system 300 may provide a more accurate approach to inventory at the container terminal 301. The control system 300 may discover, identify, classify and locate inventory located in the container terminal 301, such as a rail yard or distribution center. Moreover, the control system 300 may be combined with the control system 200 for the railway yard to provide the platform to move automation to the RCLs 203a-203b. Operational information, such as asset class, container or trailer, supplier and supplier ID, seal status, road ability metrics, are a few of the data points the control system 300 will analyze and update to the database 310.

In the control system 300, by moving the yard check function to the terminal tractor 303a-303c, inventory updates are continuous and inherently safer. Manual inventory checks may require that employees walk or drive and stop within production environments. While training and protocols may dictate, workers drive the yard and stop to record details. Many ignore safety violations-distracted driving, rolling rather than stopping, and driving and typing. Further, personnel may be impatient due to facility congestion and lengthy waits at the gates. Their driving patterns can be more aggressive and endanger distracted employees. The control system 300 may alleviate this issue by removing manual inventory checks on entry. In combination with the control system 200, fully automated management of the plurality of containers 304a-304n is possible.

With the control system 300, inventory is updated by each terminal tractor 303a-303c as it executes work orders. Work order verification is done in the spot not at trackside or at the warehouse door. Inventory is sent via the control system 300 to the clients TOS or TMS. Units that are not officially integrated or ramped are discovered naturally. Lot/Row/Spot designations are supplemented with geolocation, which also eliminates blind spots and inaccurate inventory in locations designated for overflow parking. In short, the server 307 builds a map of the container terminal 301 supplemented with geolocation data.

The control system 300 may help users make smarter, faster decisions that can boost the entire operation's efficiency and profitability. In typical approaches, operations teams are often buried in operational details and processes. The control system 300 removes the uncertainty obscured by the lack of visibility, allowing operations teams to view their facility zoomed in or out. Predictive analytics, real-time data, internet-connected machinery, and automation may help companies become proactive to focus on growth strategies.

Furthermore, the control system 300 may be readily retrofitted onto existing systems with minor modifications to the terminal tractors 303a-303c. The control system 300 also can operate without L/R/S designations (i.e. parking lot striping).

Figure 16:
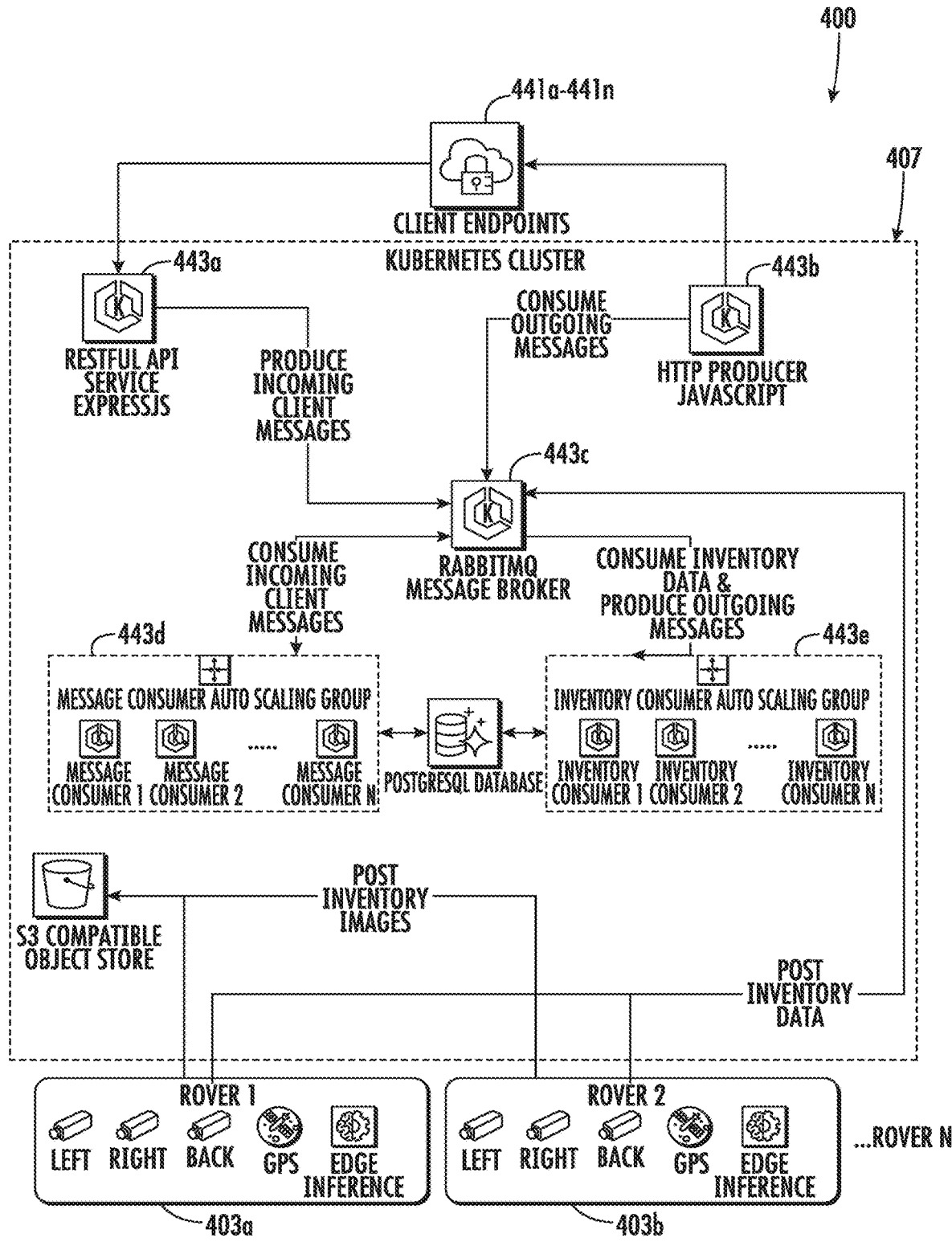
FIG. 16 is a schematic diagram of a control system, according to a fourth example embodiment of the present disclosure.
Figure 17:
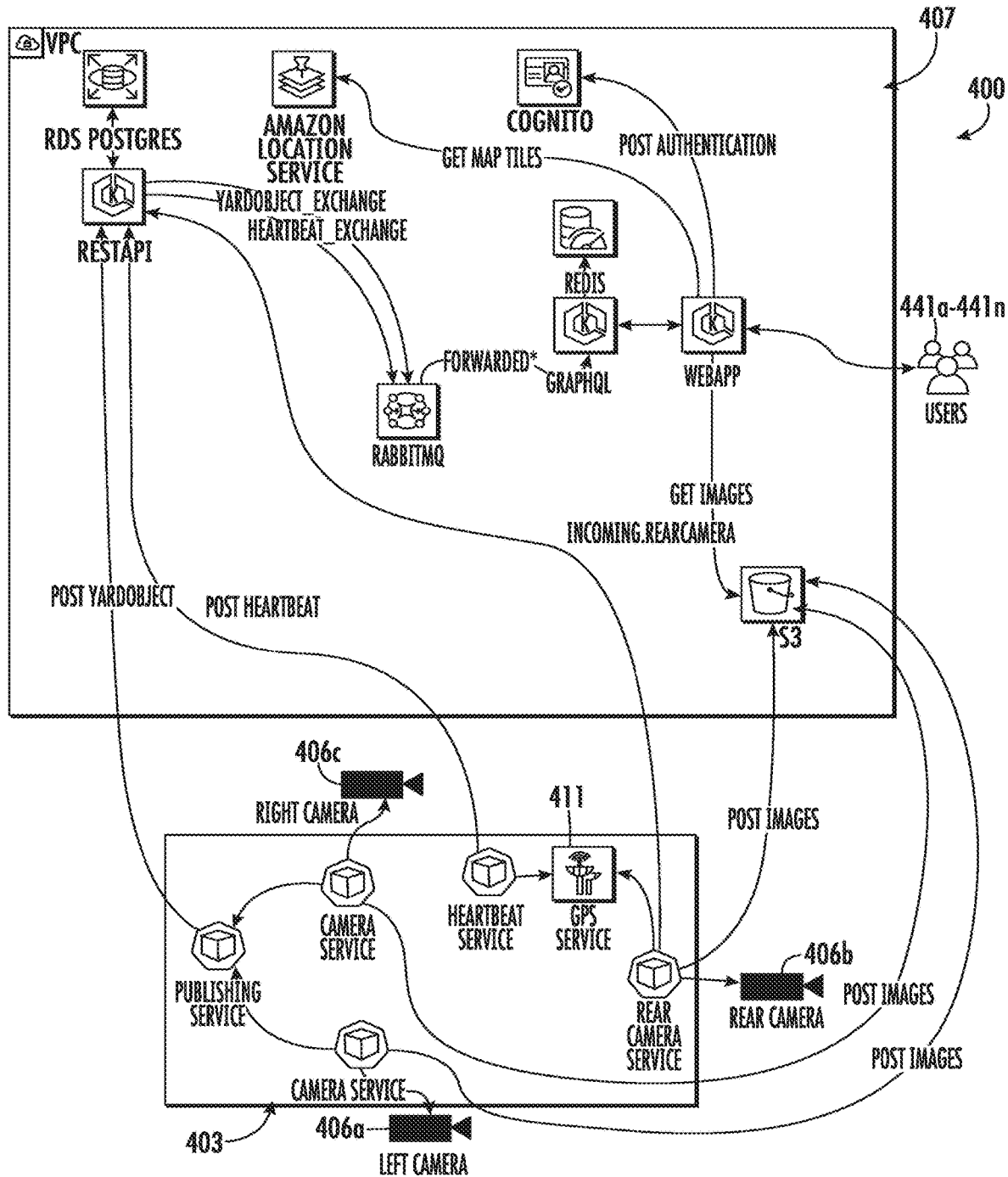
FIG. 17 is another schematic diagram of the control system of FIG. 16.

Referring now additionally to FIGS. 16-17, another embodiment of the control system 400 is now described. In this embodiment of the control system 400, those elements already discussed above with respect to FIGS. 14-15 are incremented by 100 and most require no further discussion herein. This embodiment differs from the previous embodiment in that this control system 400 illustratively includes a server 407 provided within a cloud platform. The server 407 illustratively comprises messaging modules 443a-443e for controlling notification messages to the plurality of mobile wireless communications devices 441a-441n.

The server 407 illustratively comprises a Relational Database Service (RDS) Postgres module to manage complex and time-consuming administrative tasks, such as PostgreSQL software installation and upgrades; storage management; replication for high availability and read throughput; and backups for disaster recovery. The server 407 comprises an Amazon Location Services module as a location-based service that developers can use to add geospatial data and location functionality to applications. Customers can visualize data on a map, recommend routes, use geocoding to convert plain text addresses into geographic coordinates, use reverse geocoding to convert latitude and longitude coordinates into addresses, and monitor and track assets such as fleets of vehicles.

The server 407 illustratively comprises a Cognito module to provide an identity store that scales to millions of users, supports social and enterprise identity federation, and offers advanced security features to protect your consumers and business. Built on open identity standards, the Cognito module supports various compliance regulations and integrates with frontend and backend development resources.

The server 407 illustratively comprises a Restful API module as an interface that two computer systems use to exchange information securely over the Internet. Most business applications have to communicate with other internal and third-party applications to perform various tasks. The RESTful API module supports this information exchange because they follow secure, reliable, and efficient software communication standards.

The server 407 illustratively comprises a RabbitMQ module, which is an open source message broker software (sometimes called message-oriented middleware) that implements the Advanced Message Queuing Protocol (AMQP). The RabbitMQ module is written in the Erlang programming language and is built on the Open Telecom Platform framework for clustering and failover. Client libraries to interface with the broker are available for all major programming languages.

The server 407 illustratively comprises a GraphQL module designed to make APIs fast, flexible, and developer-friendly. It can even be deployed within an integrated development environment (IDE) known as GraphiQL. As an alternative to REST, the GraphQL module lets developers construct requests that pull data from multiple data sources in a single API call.

The server 407 illustratively comprises a Redis module used with streaming solutions, such as Apache Kafka and Amazon Kinesis as an in-memory data store to ingest, process, and analyze real-time data with sub-millisecond latency. The Redis module may be an ideal choice for real-time analytics use cases such as social media analytics, ad targeting, personalization, and IoT.

Figure 18:
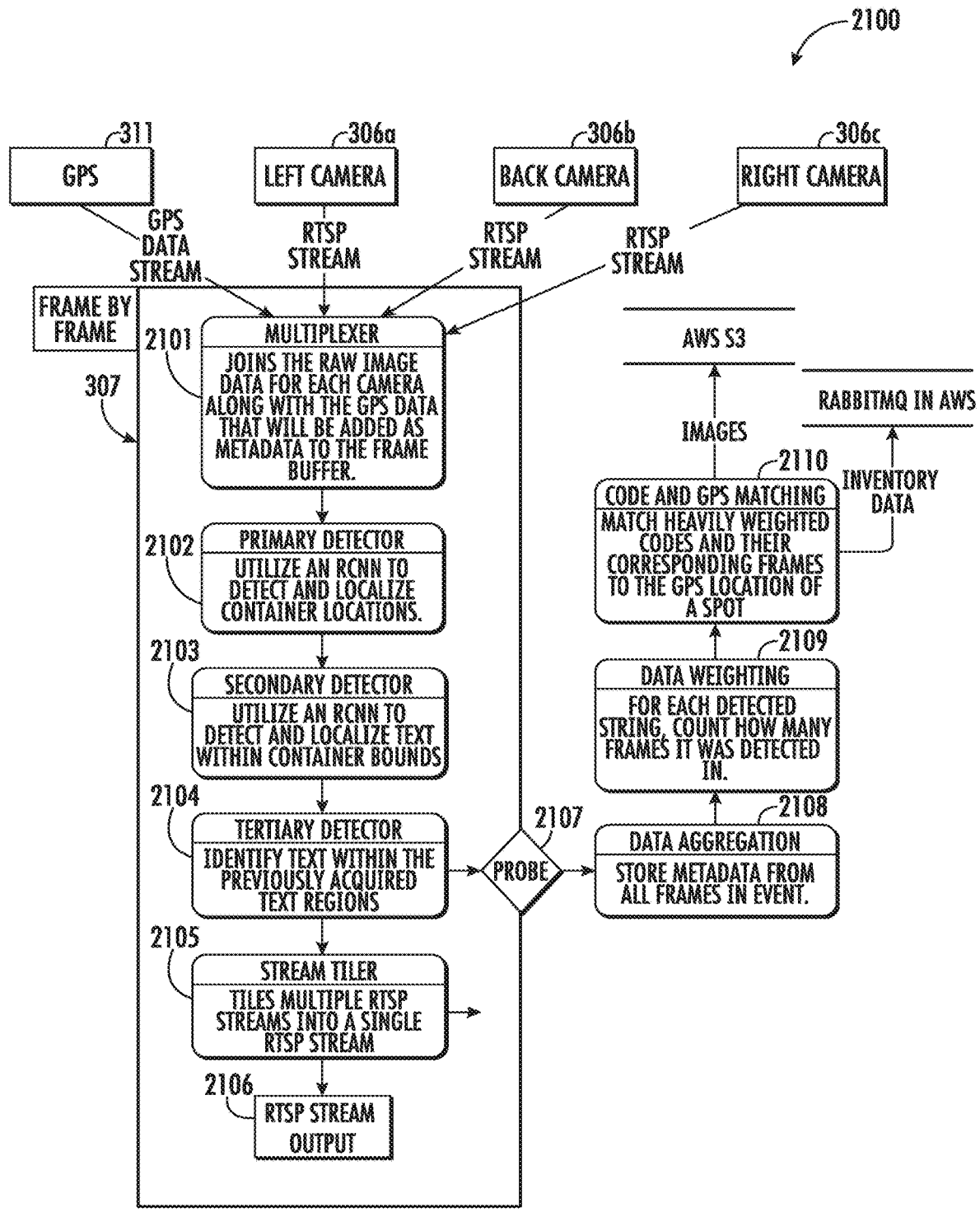
FIG. 18 is a flowchart showing operation within a server of the control system of FIG. 14.

Referring now additionally to FIG. 18, a method for operating the control system 300 is now described with reference to a flowchart 2100. The method illustratively includes ingesting respective Real-Time Streaming Protocol (RTSP) streams from the plurality of onboard tractor sensors 306a-306c and the geolocation device 311. On a frame-by-frame basis, the server 307 includes a multiplexer module 2101 to join raw image data from each sensor along with the geolocation data, and a primary detector module 2102 using R-CNN to detect and localize text container locations.

The server 307 illustratively includes a secondary detector module 2103 using an R-CNN to detect and localize text within he container bounds, and a tertiary detector module 2104 to identify text within the previously acquired text regions. The server 307 illustratively comprises a stream tiler module 2105 to tile multiple RTSP streams into a single RTSP stream, and an output module 2106 to output the single RTSP stream. The server 307 also includes a probe module 2107 to receive an output from the tertiary detector module 2104, a data aggregation module 2108 to store metadata from all frames in the event, and a data weighting module 2109 to count, for each detected string, how many frames contained the detected string. The server 307 comprises a code and matching module 2110 to match heavily weighted codes and their corresponding frames to the geolocation associated therewith.

Figure 19:
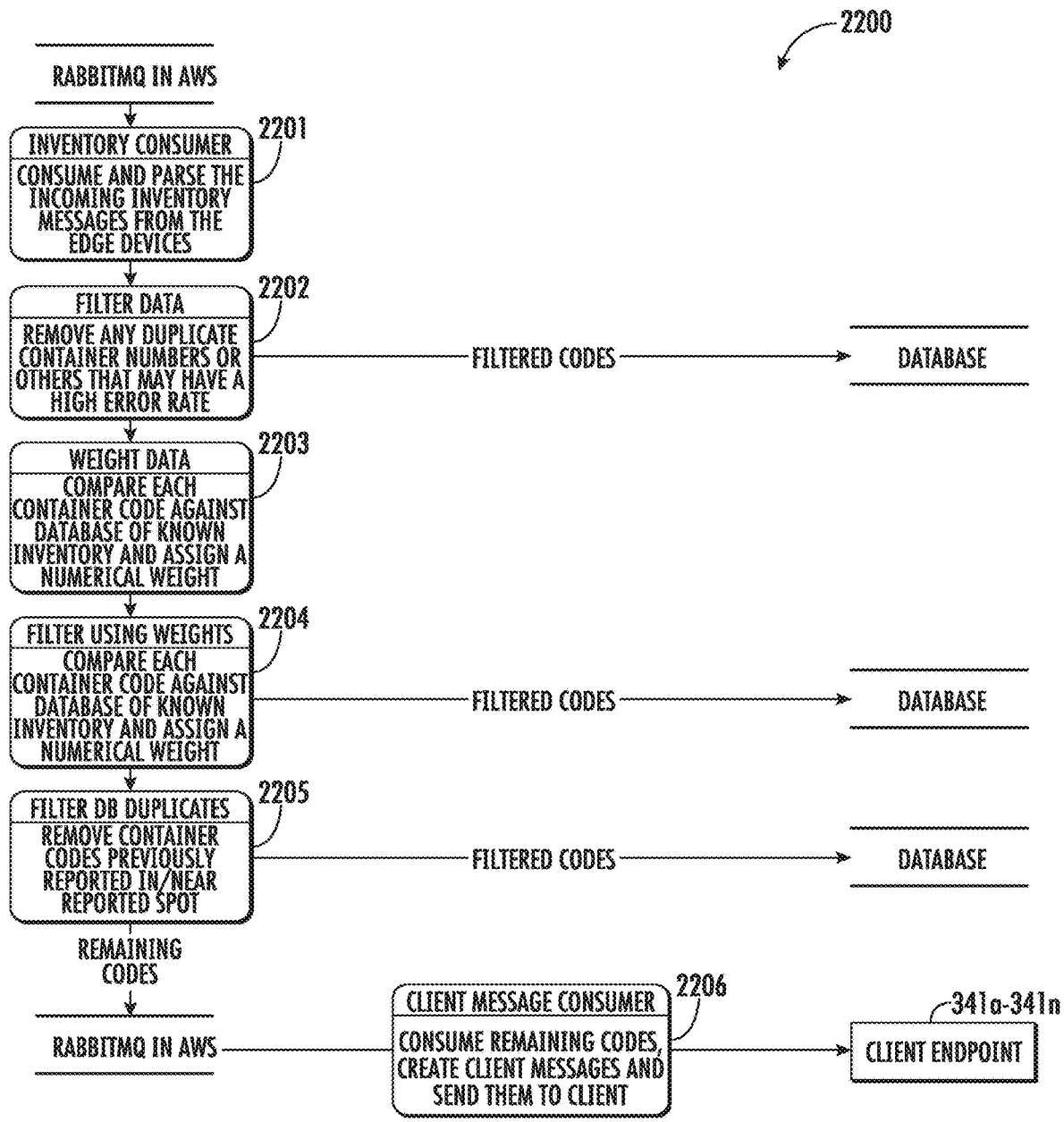
FIG. 19 is another flowchart showing operation within the server of the control system of FIG. 14.

Referring now additionally to FIG. 19, the method for operating the control system 300 is now described with reference to a flowchart 2200. Broadly, this flowchart 2200 provides an overview of the data processing of the container image data. The method includes an inventory consumer step 2201 to consume and parse the incoming inventory messages from the terminal tractors 303a-303c, and a data filtering step 2202 to remove and duplicate container numbers or others that may have a high error rate. The method also includes a weighting step 2203 to compare each container code against a database of known inventory and assign a numerical weight thereto, and a weight filtering step 2204 to filter based upon the assigned weight. The method also includes a duplicate removal step 2205 to remove container codes previously reported in or near the reported geolocation, and a client message consumer step 2206 to consume remaining codes and create client messages and send them to the plurality of mobile wireless communications devices 341a-341n.

Figure 20A:
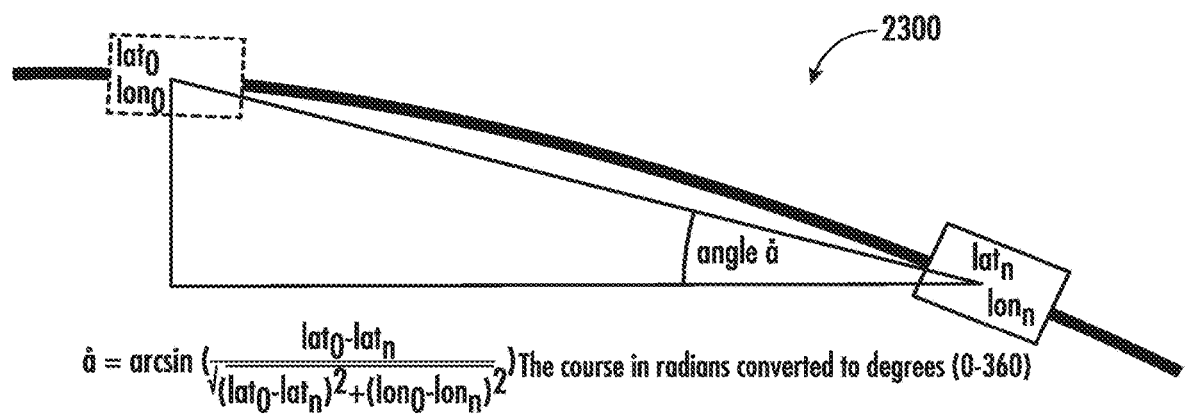
FIGS. 20A-20B are diagrams showing geolocation calculations in the control system of FIG. 14.
Figure 20B:
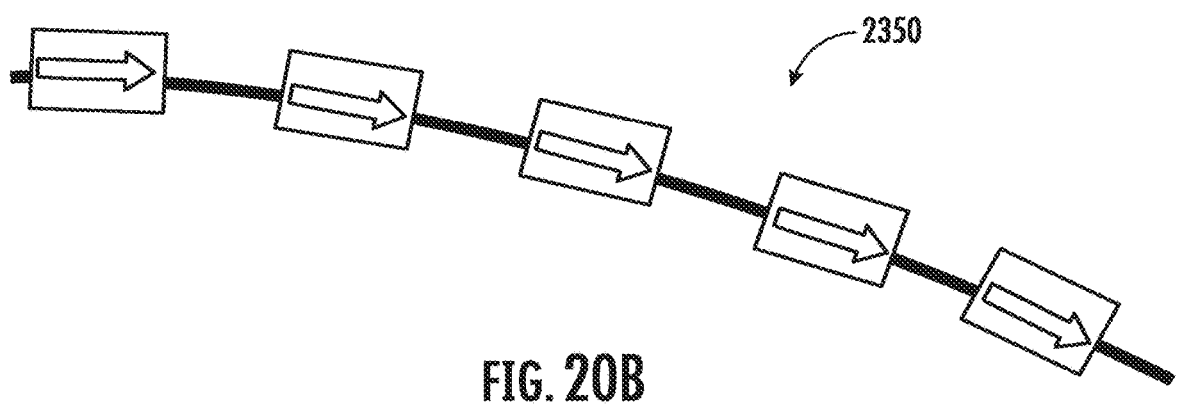

Referring now additionally to FIGS. 20A-20B, the method for operating the control system 300 is now described with reference to a flowchart 2300, 2350. Broadly, these flowcharts 2300, 2350 provide an overview of geolocation data processing for the terminal tractors 303a-303c. Here, the main purpose is to assign a detected label coordinates to a closest spot's coordinate. Based on a few previous geolocation points of terminal tractors 303a-303c position, the system can calculate the vehicle's course relatively to the North. Each detected label contains a coordinate and a direction (e.g. latitude, longitude, angle).

Although the control system 300 is illustrated in the application of the container terminal 301, this control system 300 may be applied in other container applications, such as the railway yard 201. Also, the control system 300 may be deployed in container warehouses and other distribution points downstream. Indeed, the control system 300 can be deployed in any application where fast and accurate inventory of containers is needed.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A control system for an inventory management facility, the control system comprising:
one or more shipping assets in the inventory management facility;
one or more sensors configured to generate sensor data of the one or more shipping assets; and
a server in communication with the one or more sensors, the server including one or more processors and one or more non-transitory computer-readable storage mediums storing instructions comprising one or more algorithms that when executed by the one or more processors cause the one or more processors to perform steps to:
generate a database associated with the one or more shipping assets based upon the sensor data; and
track at least one of a location or a movement, or a combination thereof, of a shipping asset of the one or more shipping assets within the inventory management facility, wherein the one or more sensors comprises one or more image sensors configured to generate image data, and wherein the server is configured to identify a shipping asset of the one or more shipping assets based upon the image data, wherein the server is configured to perform optical character recognition (OCR) on the image data including at least one of:
generating a text string for the shipping asset,
determining a color of the shipping asset, or
generating logo image data associated with a logo carried by the shipping asset, or
a combination of two or more thereof; and wherein the server is configured to perform machine learning on the image data including executing at least one of:
a first machine learning model comprising a neural network trained to predict a location of text sequences in the image data; or
a second machine learning model comprising a neural network for scanning the text sequences and predicting a sequence of missing characters; or
a combination thereof, wherein the server is configured to track the at least one of the location or the movement, or the combination thereof, of the shipping asset within the inventory management facility based on the at least one of the generated text string for the shipping asset, the determined color of for the shipping asset, or the generated logo image data for the shipping asset, or the combination of two or more thereof; and one or more vehicles in the inventory management facility,
wherein the server is in communication with a vehicle of the one or more vehicles and is configured to transmit one or more operational values to the vehicle to position the shipping asset at a predetermined location within the inventory management facility based upon the sensor data, and
wherein the vehicle comprises:
a geolocation device configured to generate a geolocation value for the vehicle;
a wireless transceiver configured to communicate with the server; and
a controller coupled to the wireless transceiver and the geolocation device,
wherein the controller is configured to transmit the geolocation value for the vehicle to the server.

2. The control system of claim 1, wherein the inventory management facility includes at least one of:
a railyard, a railroad classification yard, a terminal, a container terminal, an intermodal yard, a warehouse, a container warehouse, a distribution facility, or a docked container ship, or a combination of two or more thereof.

3. The control system of claim 1, wherein the one or more shipping assets includes at least one of:
a container, a railcar container, a railcar, freight, a truck, a hostler, a bobtail, a trailer, an intermodal carrier, a boxcar, a cargobeamer car, a coil car, a combine car, a flatcar, a container flatcar, a schnable car, a gondola car, a Presflo car, a Prestwin car, a bulk cement wagon car, a roll-block car, a slate wagon car, a stock car, a tank car, a tank wagon car, a tanker, a milk car, a "Whale Belly" car, a transporter wagon car, a well car, a watercraft, or a container ship, or a combination of two or more thereof.

4. The control system of claim 1, further comprising one or more vehicles in the inventory management facility,
wherein the server is in communication with a vehicle of the one or more vehicles and is configured to transmit one or more operational values to the vehicle to position the shipping asset at a predetermined location within the inventory management facility based upon the sensor data, and
wherein the one or more vehicles includes one of:
a terminal tractor;
a remote control terminal tractor;
a locomotive; or
a remote control locomotive, or
a combination of two or more thereof.

5. The control system of claim 4, wherein the terminal tractor includes one of:
a hostler, a truck, a bobtail, or a Rubber Tired Gantry Crane (RTG), or a combination of two or more thereof.

6. The control system of claim 1, wherein the one or more image sensors is one of:
mounted in a fixed location in the inventory management facility;
mounted onboard one or more vehicles in the inventory management facility;
mounted onboard one or more remote control vehicles in the inventory management facility;
mounted at an entry point of the inventory management facility;
mounted at an exit point of the inventory management facility; or
mounted onboard a Rubber Tired Gantry Crane (RTG) in the inventory management facility; or
a combination of two or more thereof.

7. The control system of claim 1, wherein the database comprises, for the shipping asset of the one or more shipping assets, at least one of:
a shipping asset type value, a shipping asset logo image, a vehicle classification value of a vehicle loaded with the shipping asset, a supplier, a supplier ID, a seal status, or a road ability metric, or a combination of two or more thereof.

8. The control system of claim 1,
wherein the first machine learning model comprises a convolutional neural network (CNN) trained to predict the location of text sequences in the image data; or
wherein the second machine learning model comprises a recurrent neural network (RNN) for scanning the text sequences and predicting the sequence of missing characters; or
a combination thereof.

9. The control system of claim 1, wherein the server is configured to monitor one or more vehicles in the inventory management facility for traffic violations.

10. The control system of claim 1, wherein the one or more sensors further comprises one or more proximity sensors configured to detect a presence of one or more vehicles in the inventory management facility.

11. The control system of claim 10, wherein the one or more proximity sensors includes one of a range finder sensor or a pressure sensor, or a combination thereof.

12. A server for controlling an inventory management facility including one or more shipping assets, wherein the server is in communication with one or more sensors configured to generate sensor data of the one or more shipping assets in the inventory management facility, the server comprising:
  one or more processors and one or more non-transitory computer-readable storage mediums storing instructions comprising one or more algorithms that when executed by the one or more processors cause the one or more processors to perform steps to:
    generate a database associated with the one or more shipping assets based upon the sensor data; and
    track at least one of a location or a movement, or a combination thereof, of a shipping asset of the one or more shipping assets within the inventory management facility,
    wherein the one or more sensors comprises one or more image sensors configured to generate image data,
    wherein the server is configured to identify a shipping asset of the one or more shipping assets based upon the image data,
    wherein the server is configured to perform optical character recognition (OCR) on the image data including at least one of:
      generating a text string for the shipping asset,
      determining a color of the shipping asset, or
      generating logo image data associated with a logo carried by the shipping asset, or
      a combination of two or more thereof; and
    wherein the server is configured to perform machine learning on the image data including executing at least one of:
      a first machine learning model comprising a neural network trained to predict a location of text sequences in the image data; or
      a second machine learning model comprising a neural network for scanning the text sequences and predicting a sequence of missing characters; or
      a combination thereof,
    wherein the server is configured to track the at least one of the location or the movement, or the combination thereof, of the shipping asset within the inventory management facility based on the at least one of the generated text string for the shipping asset, the determined color of for the shipping asset, or the generated logo image data for the shipping asset, or the combination of two or more thereof; and
  one or more vehicles in the inventory management facility,
    wherein the server is in communication with a vehicle of the one or more vehicles and is configured to transmit one or more operational values to the vehicle to position the shipping asset at a predetermined location within the inventory management facility based upon the sensor data, and
    wherein the vehicle comprises:
      a geolocation device configured to generate a geolocation value for the vehicle;
      a wireless transceiver configured to communicate with the server; and
      a controller coupled to the wireless transceiver and the geolocation device,
        wherein the controller is configured to transmit the geolocation value for the vehicle to the server.

13. The server of claim 12, wherein the inventory management facility includes at least one of a railyard, a railroad classification yard, a terminal, a container terminal, an intermodal yard, a warehouse, a container warehouse, a distribution facility, or a docked container ship, or a combination of two or more thereof,
  wherein the one or more shipping assets includes at least one of a container, a railcar container, a railcar, freight, a truck, a hostler, a bobtail, a trailer, an intermodal carrier, a boxcar, a cargobeamer car, a coil car, a combine car, a flatcar, a container flatcar, a schnable car, a gondola car, a Presflo car, a Prestwin car, a bulk cement wagon car, a roll-block car, a slate wagon car, a stock car, a tank car, a tank wagon car, a tanker, a milk car, a "Whale Belly" car, a transporter wagon car, a well car, a watercraft, or a container ship, or a combination of two or more thereof, and
  wherein the server is in communication with a vehicle of the one or more vehicles in the inventory management facility and is configured to transmit one or more operational values to the vehicle to position the shipping asset at a predetermined location within the inventory management facility based upon the sensor data, and
  wherein the one or more vehicles includes at least one of a terminal tractor, a remote control terminal tractor, a locomotive, or a remote control locomotive, or a combination of two or more thereof.

14. The server of claim 12, wherein the database comprises, for the shipping asset of the one or more shipping assets, at least one of:
  a shipping asset type value, a shipping asset logo image, a vehicle classification value of a vehicle loaded with the shipping asset, a supplier, a supplier ID, a seal status, or a road ability metric, or a combination of two or more thereof.

15. The server of claim 12,
  wherein the first machine learning model comprises a convolutional neural network (CNN) trained to predict the location of text sequences in the image data; or
  wherein the second machine learning model comprises a recurrent neural network (RNN) for scanning the text sequences and predicting the sequence of missing characters; or
  a combination thereof.

16. A method for operating a control system for an inventory management facility including one or more shipping assets, and one or more sensors configured to generate sensor data of the one or more shipping assets in the inventory management facility, the method comprising:
  operating a server in communication with the one or more sensors to generate a database associated with the one or more shipping assets based upon the sensor data;
  tracking at least one of a location or a movement, or a combination thereof, of a shipping asset of the one or more shipping assets within the inventory management facility, wherein the one or more sensors comprises one or more image sensors configured to generate image data,
    wherein the server is configured to identify a shipping asset of the one or more shipping assets based upon the image data,
    wherein the step of operating the server to generate the database comprises performing optical character recognition (OCR) on the container image data including at least one of:
      generating a text string for the shipping asset,
      determining a color of the shipping asset, or
      generating logo image data associated with a logo carried by the shipping asset, or
      a combination of two or more thereof;

wherein the step of operating the server to generate the database comprises performing machine learning on the image data including at least one of:
- executing a first machine learning model comprising a neural network trained to predict a location of text sequences in the image data; or
- executing a second machine learning model comprising a neural network for scanning the text sequences and predicting a sequence of missing characters, or
- a combination thereof;

wherein the server is configured to track the at least one of the location or the movement, or the combination thereof, of the shipping asset within the inventory management facility based on the at least one of the generated text string for the shipping asset, the determined color of for the shipping asset, or the generated logo image data for the shipping asset, or the combination of two or more thereof; and wherein the server is in communication with one or more vehicles in the inventory management facility; and operating the server to transmit one or more operational values to the vehicle to position the shipping asset at a predetermined location within the inventory management facility based upon the sensor data.

17. The method of claim 16, wherein the inventory management facility includes at least one of a railyard, a railroad classification yard, a terminal, a container terminal, an intermodal yard, a warehouse, a container warehouse, a distribution facility, or a docked container ship, or a combination of two or more thereof, wherein the one or more shipping assets includes at least one of a container, a railcar container, a railcar, freight, a truck, a hostler, a bobtail, a trailer, an intermodal carrier, a boxcar, a cargobeamer car, a coil car, a combine car, a flatcar, a container flatcar, a schnable car, a gondola car, a Presflo car, a Prestwin car, a bulk cement wagon car, a roll-block car, a slate wagon car, a stock car, a tank car, a tank wagon car, a tanker, a milk car, a "Whale Belly" car, a transporter wagon car, a well car, a watercraft, or a container ship, or a combination of two or more thereof; and wherein the one or more vehicles includes at least one of a terminal tractor, a remote control terminal tractor, a locomotive, or a remote control locomotive, or a combination of two or more thereof.

18. The method of claim 16, wherein the step of operating the server to generate the database comprises generating, for the shipping asset, at least one of:

a shipping asset type value, a shipping asset logo image, a vehicle classification value of a vehicle loaded with the shipping asset, a supplier, a supplier ID, a seal status, or a road ability metric, or a combination of two or more thereof.

19. The method of claim 16, wherein the first machine learning model comprising the neural network includes a convolutional neural network (CNN) trained to predict the location of text sequences in the image data; or wherein the second machine learning model comprising the neural network includes a recurrent neural network (RNN) for scanning the text sequences and predicting the sequence of missing characters, or a combination thereof.

\* \* \* \* \*